US011930552B2

United States Patent
Shrestha et al.

(10) Patent No.: US 11,930,552 B2
(45) Date of Patent: Mar. 12, 2024

(54) TIMERS FOR ENHANCED COVERAGE WITH NON-TERRESTRIAL NETWORK

(71) Applicant: QUALCOMM Incorporated, San Diego, CA (US)

(72) Inventors: Bharat Shrestha, San Diego, CA (US); Mungal Singh Dhanda, Slough (GB); Umesh Phuyal, San Diego, CA (US); Alberto Rico Alvarino, San Diego, CA (US); Ayan Sengupta, San Diego, CA (US); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 269 days.

(21) Appl. No.: 17/248,213

(22) Filed: Jan. 14, 2021

(65) Prior Publication Data

US 2022/0225467 A1    Jul. 14, 2022

(51) Int. Cl.
  *H04W 76/28* (2018.01)
  *H04L 1/08* (2006.01)
  *H04L 1/1812* (2023.01)
  *H04L 47/283* (2022.01)

(52) U.S. Cl.
  CPC ............. *H04W 76/28* (2018.02); *H04L 1/08* (2013.01); *H04L 1/1812* (2013.01); *H04L 47/283* (2013.01)

(58) Field of Classification Search
  CPC ........ H04W 76/28; H04L 1/08; H04L 1/1812; H04L 47/283
  See application file for complete search history.

(56) References Cited

U.S. PATENT DOCUMENTS

| | | | | |
|---|---|---|---|---|
| 11,252,753 | B2* | 2/2022 | Chen | H04L 1/1896 |
| 2020/0107356 | A1* | 4/2020 | Rico Alvarino | H04W 72/23 |
| 2020/0137786 | A1* | 4/2020 | Lee | H04L 5/16 |
| 2020/0245395 | A1* | 7/2020 | Zhang | H04L 5/0053 |
| 2022/0007455 | A1* | 1/2022 | Hong | H04W 76/28 |
| 2022/0158770 | A1* | 5/2022 | Hong | H04L 1/1671 |
| 2022/0240283 | A1* | 7/2022 | Hong | H04L 5/0055 |
| 2022/0361247 | A1* | 11/2022 | Awad | H04W 74/0833 |
| 2022/0393794 | A1* | 12/2022 | Wang | H04L 1/1887 |
| 2022/0394810 | A1* | 12/2022 | Hong | H04L 1/1883 |

FOREIGN PATENT DOCUMENTS

| | | |
|---|---|---|
| WO | WO-2016073591 A1 | 5/2016 |
| WO | WO-2020071698 A1 | 4/2020 |

OTHER PUBLICATIONS

International Search Report and Written Opinion—PCT/US2021/072655—ISA/EPO—dated Mar. 16, 2022.

(Continued)

*Primary Examiner* — Christopher M Crutchfield
*Assistant Examiner* — Tito Q Pham
(74) *Attorney, Agent, or Firm* — Harrity & Harrity, LLP

(57) ABSTRACT

Various aspects of the present disclosure generally relate to wireless communication. In some aspects, a user equipment (UE) may start a timer after a repetition of a communication, where calculation of a length of the timer includes an offset that corresponds to a propagation delay between the UE and a base station via a non-terrestrial network (NTN) entity. The UE may start a discontinuous reception (DRX) retransmission timer after expiration of the timer. Numerous other aspects are described.

29 Claims, 16 Drawing Sheets

(56) References Cited

OTHER PUBLICATIONS

OPPO: "Discussion on DRX Operation in NTN", 3GPP TSG-RAN WG2 Meeting #108, 3GPP Draft, R2-1915167, 3rd Generation Partnership Project (3GPP), Mobile Competence Centre, 650, Route Des Lucioles, F-06921 Sophia-Antipolis Cedex, France, vol. RAN WG2, No. Reno, USA, Nov. 18, 2019-Nov. 22, 2019, pp. 1-7, Nov. 8, 2019 (Nov. 8, 2019), XP051817063, Retrieved from the Internet: URL: https://ftp.3gpp.org/tsg_ran/WG2_RL2/TSGR2_108/Docs/R2-1915167.zip R2-1915167.doc [retrieved on Nov. 8, 2019] p. 4.

Oppo: "HARQ Impact on MAC Procedures in NTN", 3GPP TSG-RAN WG2 Meeting #112 electronic, 3GPP Draft, R2-2009108, 3rd Generation Partnership Project (3GPP), Mobile Competence Centre, 650, Route Des Lucioles, F-06921 Sophia-Antipolis Cedex, France, vol. RAN WG2, No. Electronic, Online, Nov. 2, 2020-Nov. 13, 2020, pp. 1-5, Oct. 23, 2020 (Oct. 23, 2020), XP051942138, Retrieved from the Internet: URL: https://ftp.3gpp.org/tsg_ran/WG2_RL2/SGR2_112-e/Docs/R2-2009108.zip R2-2009108 - HARQ impact on MAC procedures in NTN.doc [retrieved on Oct. 23, 2020] p. 3.

Qualcomm Incorporated: "Applicability of eMTC and NB-IoT feature in NTN", 3GPP TSG-RAN WG2 Meeting #113e, 3GPP Draft, R2-2100737, 3rd Generation Partnership Project (3GPP), Mobile Competence Centre, 650, Route Des Lucioles, F-06921 Sophia-Antipolis Cedex, France, vol. RAN WG2, No. E-Meeting, Jan. 25, 2021-Feb. 5, 2021, 2 Pages, Jan. 15, 2021 (Jan. 15, 2021), XP051973845, Retrieved from the Internet: URL: https://ftp.3gpp.org/tsg_ran/WG2_RL2/TSGR2_113-e/Docs/R2-2100737.zip R2-2100737.doc [retrieved on Jan. 15, 2021] section 2.

\* cited by examiner

TIMERS FOR ENHANCED COVERAGE WITH NON-TERRESTRIAL NETWORK

FIELD OF THE DISCLOSURE

Aspects of the present disclosure generally relate to wireless communication and to techniques and apparatuses for timers for enhanced coverage with a non-terrestrial network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes starting a timer after a communication, where calculation of a length of the timer includes an offset that corresponds to a propagation delay between the UE and a base station via a non-terrestrial network (NTN) entity. The method includes starting a discontinuous reception (DRX) retransmission timer after expiration of the timer.

In some aspects, a method of wireless communication performed by a UE includes transmitting repetitions of an uplink communication to a base station. The method includes monitoring a physical downlink control channel (PDCCH) to receive, a time period after transmitting a first repetition of the repetitions, hybrid automatic repeat request (HARQ) feedback or an uplink grant for a new transmission, where the time period corresponds to a propagation delay to the base station via a non-terrestrial network (NTN) entity. The method includes starting a DRX retransmission timer after transmitting a last repetition of the repetitions In some aspects, a method of wireless communication performed by a base station includes receiving repetitions of an uplink communication from a UE and transmitting, to the UE a first time period before a last repetition of the repetitions is received from the UE, an uplink grant for a new transmission or HARQ feedback for the uplink communication, where the first time period is based at least in part on a propagation delay between the UE and the base station via an NTN entity.

In some aspects, a UE for wireless communication includes a memory and one or more processors operatively coupled to the memory, the memory and the one or more processors configured to start a timer after a repetition of a communication, where calculation of a length of the timer includes an offset that corresponds to a propagation delay between the UE and a base station via an NTN entity. The one or more processors are configured to start a DRX retransmission timer after expiration of the timer.

In some aspects, a UE for wireless communication includes a memory and one or more processors operatively coupled to the memory, the memory and the one or more processors configured to transmit repetitions of an uplink communication to a base station, and monitor a PDCCH to receive, a time period after transmitting a first repetition of the repetitions, HARQ feedback or an uplink grant for a new transmission, where the time period corresponds to a propagation delay to the base station via a NTN entity. The one or more processors are configured to start a DRX retransmission timer after transmitting a last repetition of the repetitions In some aspects, a base station for wireless communication includes a memory and one or more processors operatively coupled to the memory, the memory and the one or more processors configured to receive repetitions of an uplink communication from a UE, and transmit, to the UE a first time period before a last repetition of the repetitions is received from the UE, an uplink grant for a new transmission or HARQ feedback for the uplink communication, where the first time period is based at least in part on a propagation delay between the UE and the base station via an NTN entity.

In some aspects, a non-transitory computer-readable medium storing a set of instructions for wireless communication includes one or more instructions that, when executed by one or more processors of a UE, cause the UE to start a timer after a repetition of a communication, where calculation of a length of the timer includes an offset that corresponds to a propagation delay between the UE and a base station via an NTN entity, and start a DRX retransmission timer after expiration of the timer.

In some aspects, a non-transitory computer-readable medium storing a set of instructions for wireless communication includes one or more instructions that, when executed by one or more processors of an UE, cause the UE to transmit repetitions of an uplink communication to a base station, monitor a PDCCH to receive, a time period after transmitting a first repetition of the repetitions, HARQ feedback or an uplink grant for a new transmission, where the time period corresponds to a propagation delay to the base station via a NTN entity, and start a DRX retransmission timer after transmitting a last repetition of the repetitions.

In some aspects, a non-transitory computer-readable medium storing a set of instructions for wireless communication includes one or more instructions that, when executed by one or more processors of a base station, cause the base station to receive repetitions of an uplink communication from a UE, and transmit, to the UE a first time period before a last repetition of the repetitions is received from the UE, an uplink grant for a new transmission or HARQ feedback for the uplink communication, where the first time period is based at least in part on a propagation delay between the UE and the base station via an NTN entity.

In some aspects, an apparatus for wireless communication includes means for starting a timer after a repetition of a communication, where calculation of a length of the timer includes an offset that corresponds to a propagation delay between the UE and a base station via an NTN entity, and means for starting a DRX retransmission timer after expiration of the timer.

In some aspects, an apparatus for wireless communication includes means for transmitting repetitions of an uplink communication to a base station, means for monitoring a PDCCH to receive, a time period after transmitting a first repetition of the repetitions, HARQ feedback or an uplink grant for a new transmission, where the time period corresponds to a propagation delay to the base station via a NTN entity, and means for starting a DRX retransmission timer after transmitting a last repetition of the repetitions.

In some aspects, an apparatus for wireless communication includes means for receiving repetitions of an uplink communication from a UE and means for transmitting, to the UE a first time period before a last repetition of the repetitions is received from the UE, an uplink grant for a new transmission or HARQ feedback for the uplink communication, where the first time period is based at least in part on a propagation delay between the UE and the base station via an NTN entity.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
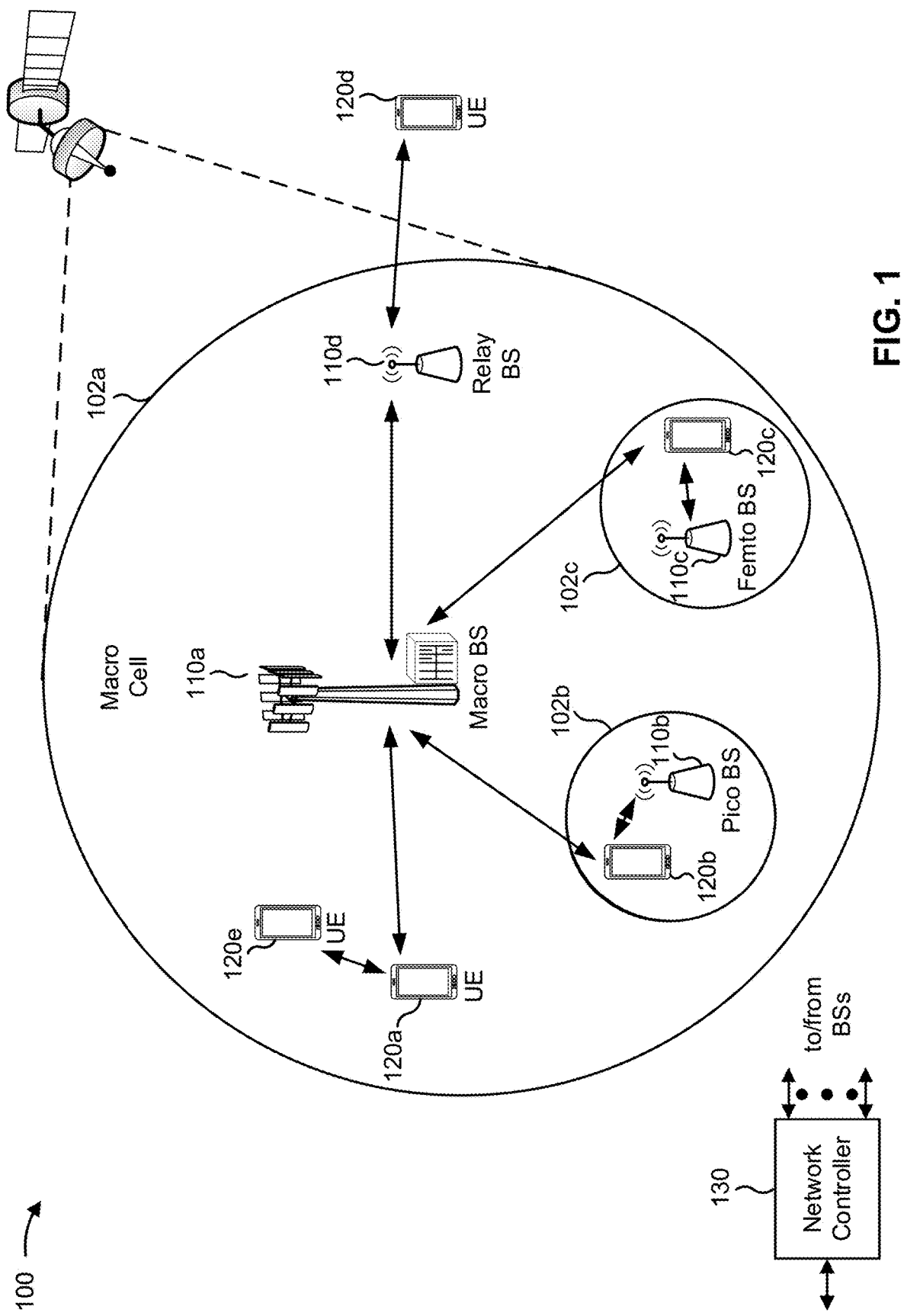
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations (BSs) 110 (shown as BS 110a, BS 110b, BS 110c, and BS 110d) and other network entities. A BS is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

In some aspects, as shown, a cell may be provided by a base station 110 of a non-terrestrial network. As used herein, "non-terrestrial network" (NTN) may refer to a network for which access is provided by a non-terrestrial base station, such as a base station carried by a satellite, a balloon, a dirigible, an airplane, an unmanned aerial vehicle, a high altitude platform station, and/or the like.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like. In some aspects, a relay station may be implemented using a non-terrestrial platform, similarly to the base station described above.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
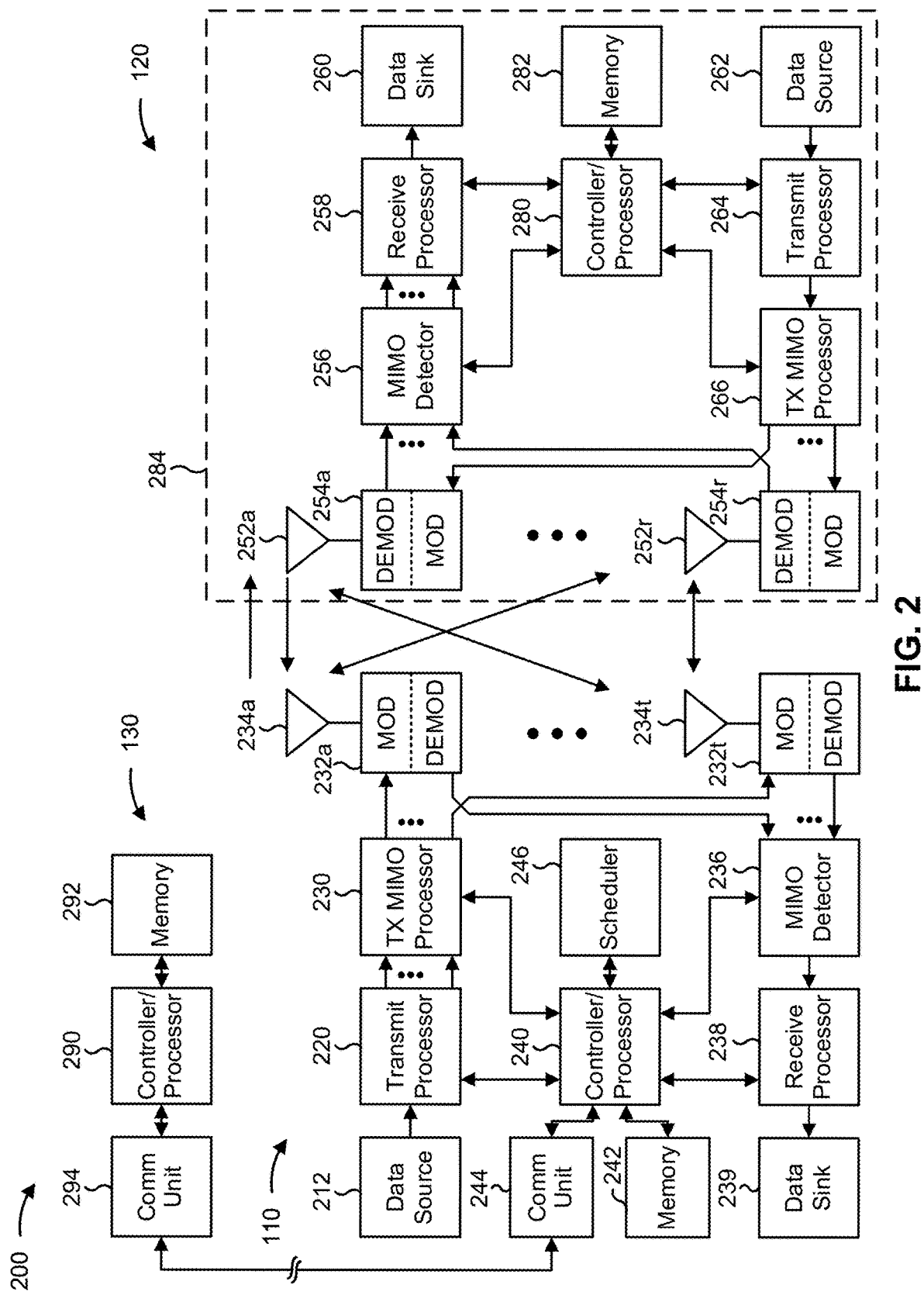
FIG. 2 is a diagram illustrating an example of a base station in communication with a user equipment (UE) in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/ or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-16.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-16.

Controller/processor 240 of base station 110, controller/processor 280 of UE 120, and/or any other component(s) of FIG. 2 may perform one or more techniques associated with timers for enhanced coverage with a non-terrestrial network, as described in more detail elsewhere herein. For example, a controller/processor of an NTN entity (e.g., controller/processor 240 of base station 110), controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, and/or other processes as described herein. A memory may store data and program codes for the NTN entity, and memories 242 and 282 may store data and program codes for base station 110 and UE 120, respectively. In some aspects, the memory for the NTN entity, memory 242, and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the NTN entity, the base station 110, and/or the UE 120, may cause the one or more processors, the NTN entity, the UE 120, and/or the base station 110 to perform or direct operations of, for example, process 1100 of FIG. 11, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, the UE 120 includes means for starting a timer after a repetition of a communication, where calculation of a length of the timer includes an offset that corresponds to a propagation delay between the UE and a base station via an NTN entity; and/or means for starting a discontinuous reception (DRX) timer (e.g., DRX retransmission timer) after expiration of the timer. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for transmitting repetitions of an uplink communication to a base station, means for monitoring a physical downlink control channel (PDCCH) to receive, a time period after transmitting a first repetition of the repetitions, hybrid automatic repeat request (HARQ) feedback or an uplink grant for a new transmission, where the time period corresponds to a propagation delay to the base station via an NTN entity, and/or means for starting a DRX timer after transmitting a last repetition of the repetitions. The DRX timer may be a DRX retransmission timer. The means for UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, UE 120 includes means for stopping the DRX retransmission timer, if running, or not starting the DRX retransmission timer, if not running, based at least in part on receiving an indication from control channel bits indicating that the HARQ feedback corresponds to a specific HARQ process associated with the DRX retransmission timer.

In some aspects, UE 120 includes means for determining a HARQ process to which the HARQ feedback corresponds based at least in part on the propagation delay or means for stopping the DRX retransmission timer associated with the HARQ process.

In some aspects, a base station 110 includes means for receiving repetitions of an uplink communication from a UE, or means for transmitting, to the UE a first time period before a last repetition of the repetitions is received from the UE, an uplink grant for a new transmission or HARQ feedback for the uplink communication, where the first time period is based at least in part on a propagation delay between the UE and the base station via an NTN entity. The means for base station 110 to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, base station 110 includes means for transmitting an indication that the HARQ feedback corresponds to all HARQ processes associated with a discontinuous reception timer.

In some aspects, base station 110 includes means for transmitting an indication that the HARQ feedback is for a first HARQ process associated with a DRX retransmission timer.

As indicated above, FIG. 2 is provided as an example. Other examples may differ from what is described with regard to FIG. 2.

Figure 3:
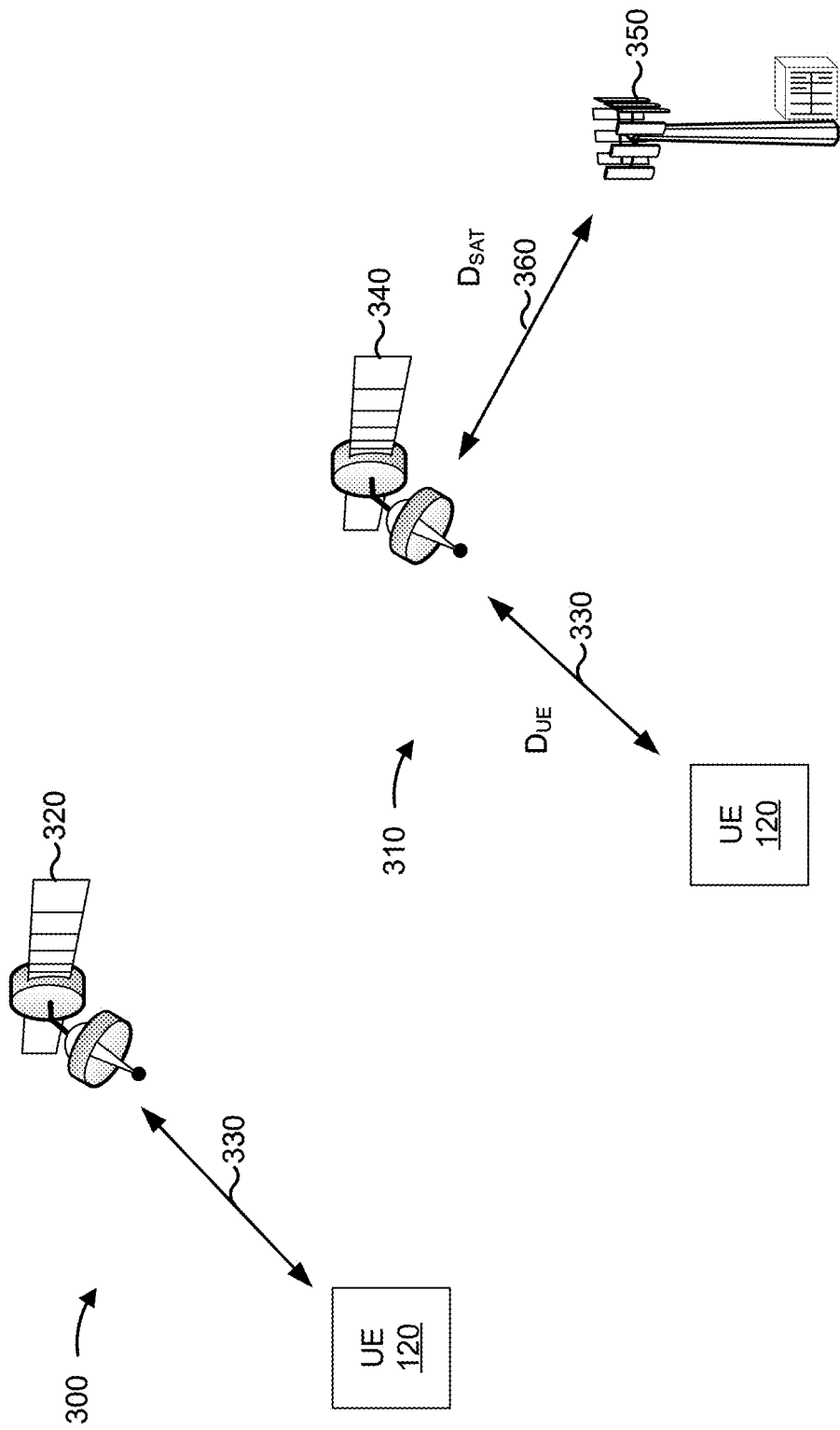
FIG. 3 is a diagram illustrating an example of a regenerative satellite deployment and an example of a transparent satellite deployment in a non-terrestrial network (NTN), in accordance with various aspects of the present disclosure.

FIG. 3 is a diagram illustrating an example 300 of a regenerative satellite deployment and an example 310 of a transparent satellite deployment in an NTN.

Example 300 shows a regenerative satellite deployment. In example 300, a UE 120 is served by a satellite 320 via a service link 330. For example, satellite 320 may include a BS 110 (e.g., BS 110a), a gNB, and/or the like. In some aspects, satellite 320 may be referred to as a non-terrestrial base station, a regenerative repeater, an on-board processing repeater, an NTN entity, and/or the like. In some aspects, satellite 320 may demodulate an uplink radio frequency signal and may modulate a baseband signal derived from the uplink radio signal to produce a downlink radio frequency transmission. Satellite 320 may transmit the downlink radio frequency signal on service link 330. Satellite 320 may provide a cell that covers UE 120.

Example 310 shows a transparent satellite deployment, which may also be referred to as a bent-pipe satellite deployment. In example 310, a UE 120 is served by a satellite 340 via the service link 330. Satellite 340 may also be considered to be an NTN entity. Satellite 340 may be a transparent satellite. Satellite 340 may relay a signal received from gateway 350 via a feeder link 360. For example, the satellite may receive an uplink radio frequency transmission and may transmit a downlink radio frequency transmission without demodulating the uplink radio frequency transmission. In some aspects, the satellite may frequency convert the uplink radio frequency transmission received on service link 330 to a frequency of the uplink radio frequency transmission of feeder link 360 and may amplify and/or filter the uplink radio frequency transmission. In some aspects, UEs 120 shown in example 300 and example 310 may be associated with a Global Navigation Satellite System (GNSS) capability, a Global Positioning System (GPS) capability, and/or the like, though not all UEs have such capabilities. Satellite 340 may provide a cell that covers UE 120.

Service link 330 may include a link between satellite 340 and UE 120 and may include one or more of an uplink or a downlink. Feeder link 360 may include a link between satellite 340 and gateway 350 and may include one or more of an uplink (e.g., from UE 120 to gateway 350) or a downlink (e.g., from gateway 350 to UE 120).

Feeder link 360 and service link 330 may each experience Doppler effects due to the movement of satellites 320 and 340, and potentially movement of a UE 120. These Doppler effects may be significantly larger than in a terrestrial network. The Doppler effect on feeder link 360 may be compensated for to some degree but may still be associated with some amount of uncompensated frequency error. Furthermore, gateway 350 may be associated with a residual frequency error, and/or the satellite 320/340 may be associated with an on-board frequency error. These sources of frequency error may cause a received downlink frequency at UE 120 to drift from a target downlink frequency.

A UE served by an NTN may use DRX to save power. DRX involves cycles of the UE sleeping ("OFF") and waking ("ON"), and the UE saves power when sleeping. The deeper the sleep, the more power the UE may save. The UE may wake up periodically to transmit a message on a physical uplink control channel (PUCCH) or a physical uplink shared channel (PUSCH) or to receive a message on a physical downlink control channel (PDCCH) or a physical downlink shared channel (PDSCH).

The UE may use DRX timers for periods of activity and inactivity. For example, when a UE receives an uplink grant or an indication on the PDCCH for transmission of new data, the UE may start a DRX inactivity timer. The DRX inactivity timer specifies how long the UE is to remain in a DRX "ON" time after reception of a message on the PDCCH. When the DRX inactivity timer expires, the UE may use a short DRX cycle if the UE is configured for a short DRX cycle. The UE may have been in a long DRX cycle.

A DRX retransmission timer specifies a maximum quantity of consecutive PDCCH subframes for which the UE is to remain active in order to monitor for an incoming retransmission. There may be one DRX retransmission timer configured for each HARQ process in the downlink (e.g., eight DRX retransmission timers). Retransmission may be triggered after a negative acknowledgement (NACK). The DRX retransmission timer is to be long enough to avoid receiving a retransmission when the UE is sleeping.

Due to the large propagation delay in an NTN, a DRX retransmission timer may not be long enough for a UE to receive or transmit communications as expected. Example 310 shows service link 330 ($D_{UE}$) and feeder link 360 ($D_{SAT}$) that may involve a long propagation delay. For example, a maximum round trip time (RTT) from the UE to a base station via a satellite in geosynchronous equatorial orbit (GEO) may be over 500 milliseconds (ms) and 25-50 ms for a satellite in low Earth orbit (LEO). If a DRX retransmission timer ends too early, the UE may not be able to receive a retransmission. Failed retransmissions may cause the UE, the base station, and the NTN entity to waste time, power, processing resources, and signaling resources with additional retransmissions that may also fail.

As indicated above, FIG. 3 provides examples. Other examples may differ from what is described with regard to FIG. 3.

Figure 4:
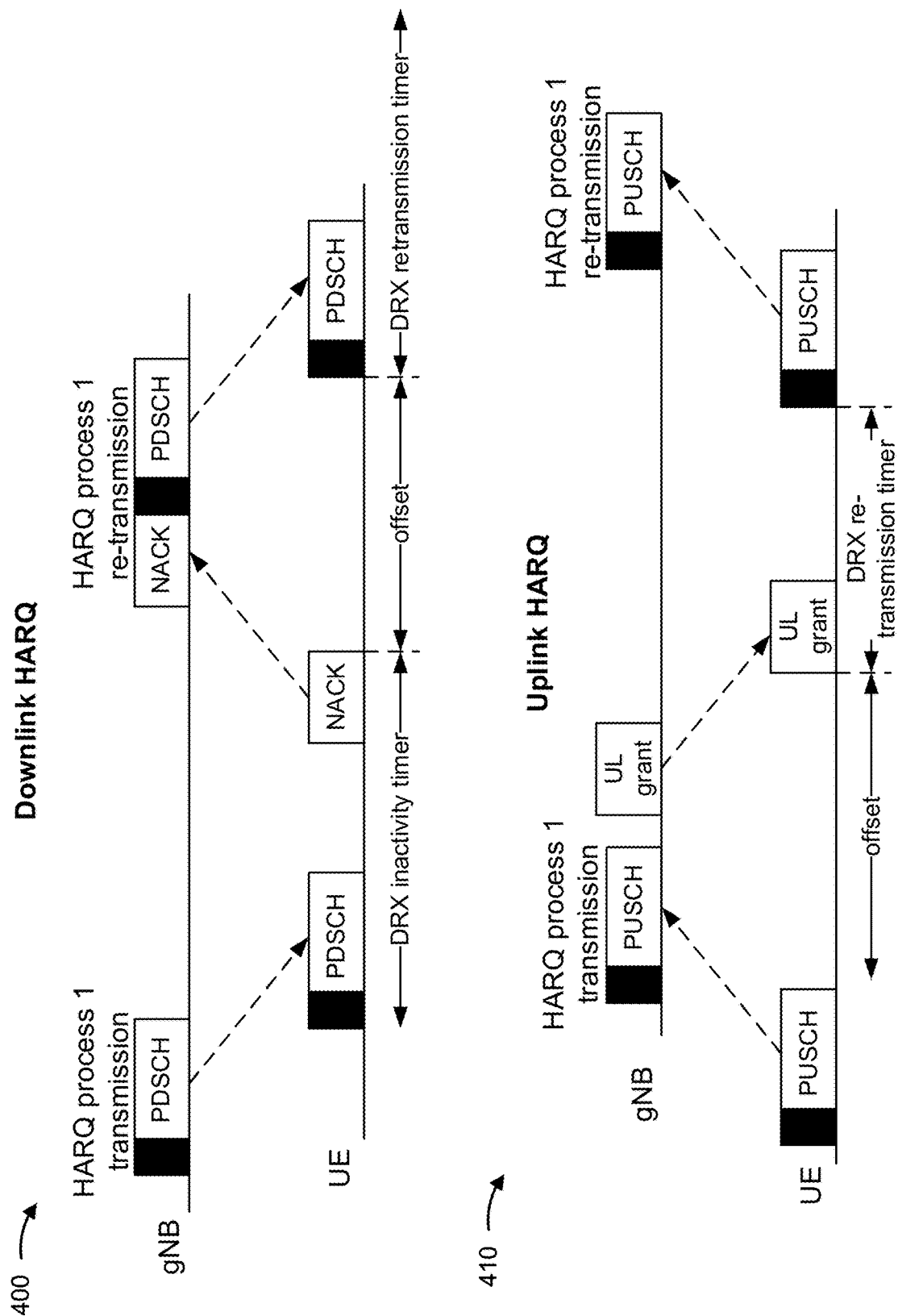
FIG. 4 is a diagram illustrating examples of using timers for enhanced coverage in an NTN, in accordance with various aspects of the present disclosure.

FIG. 4 is a diagram illustrating examples 400, 410 of using timers for enhanced coverage in an NTN, in accordance with various aspects of the present disclosure.

A UE may improve throughput in the NTN if the UE is able to transmit HARQ feedback early, because a new transmission may be scheduled in the same HARQ process using a DRX retransmission timer. PDCCH-based HARQ feedback is supported for an enhanced machine type communication (eMTC) in full duplex (FD) mode but not in eMTC half-duplex (HD) mode or in narrowband internet-of-things (NB-IoT) mode. PDCCH-based HARQ feedback may be supported for an eMTC device operating in HD or an NB-IoT device, but the DRX retransmission timer may have to be adjusted.

According to some aspects described herein, the UE may use an offset for starting a DRX retransmission timer. The offset may correspond to the propagation delay from the UE to a base station (e.g., gNB) via the NTN entity. The offset may replace or be added to a HARQ RTT timer. In this way, the UE may start the DRX retransmission timer later or handle the DRX retransmission timer in a way that accounts for the propagation delay involved with an NTN. The UE may thus receive a retransmission or an uplink grant during the DRX retransmission timer and not outside of the DRX retransmission timer when the UE is asleep. By enabling the UE to transmit or receive HARQ feedback or grants at an appropriate time, the UE may enhance coverage and conserve resources that would otherwise be wasted with additional retransmissions or missed uplink grants.

Example 400 shows an example of downlink HARQ for HARQ process 1. A UE may receive a PDSCH and provide a NACK during a DRX inactivity timer. By adding an offset to account for a longer propagation delay, the UE may receive the retransmission during the DRX retransmission timer. For example, the UE may set a timer that is set to a duration of the offset. The timer may start after transmitting a last repetition of HARQ feedback (e.g., NACK). If the UE is an NB-IoT device, the timer may have a duration of the offset plus a delta for the PDCCH, which is a minimum quantity of time slots (e.g., subframes) after a last HARQ feedback transmission. After the timer expires, the UE may start the DRX retransmission timer.

In some aspects, the timer may be a downlink HARQ RTT timer that is set to the offset. The downlink HARQ RTT timer may specify a minimum quantity of time slots (e.g., subframes) before a downlink HARQ retransmission is expected. In some aspects, a downlink HARQ RTT timer may not be used or may have a duration that is set to zero. The UE may assume little or no processing time for the base station to process HARQ feedback.

Example 410 shows uplink HARQ for HARQ process 1, where a UE transmits an uplink communication on a PUSCH and receives, after an offset, an uplink grant during a DRX retransmission timer. After the DRX retransmission timer expires, the UE may transmit a retransmission after not receiving an acknowledgement (ACK). In example 410, the UE may not use an uplink HARQ RTT timer or may use an uplink HARQ RTT timer that is set to zero. The uplink HARQ RTT timer may specify a minimum amount of time slots (e.g., subframes) before an uplink HARQ retransmission grant is expected. After transmitting an uplink communication, the UE may start a timer with a duration that is based at least in part on an offset. The offset may correspond to the propagation delay from the UE to the base station via an NTN entity.

The timer may be a HARQ RTT timer that has a duration of an offset or that is extended by the offset, based at least in part on a type of the UE. For example, for an eMTC device, a downlink HARQ RTT timer may include 7+N+offset, or 7+N+3+offset, where 7 represents 7 symbols, N represents a quantity of symbols, and 3 represents 3 symbols. The 7, N, and/or 3 may represent processing times. An uplink HARQ RTT timer may be equal to the offset. For an NB-IoT device, a downlink HARQ RTT timer may include k+N+offset+deltaPDCCH, where k may represent another quantity of symbols and deltaPDCCH may be an interval from a last time slot (e.g., subframe) of an associated HARQ feedback transmission plus three time slots to the first time slots of the next PDCCH occasion. An uplink HARQ RTT timer may be equal to offset+deltaPDCCH, where deltaPDCCH may be an interval from a last time slot (e.g., subframe) of an associated HARQ feedback transmission plus four time slots to the first time slots of the next PDCCH occasion. In other words, HARQ RTT timers may be adjusted by the offset.

As indicated above, FIG. 4 provides some examples. Other examples may differ from what is described with regard to FIG. 4.

Figure 5:
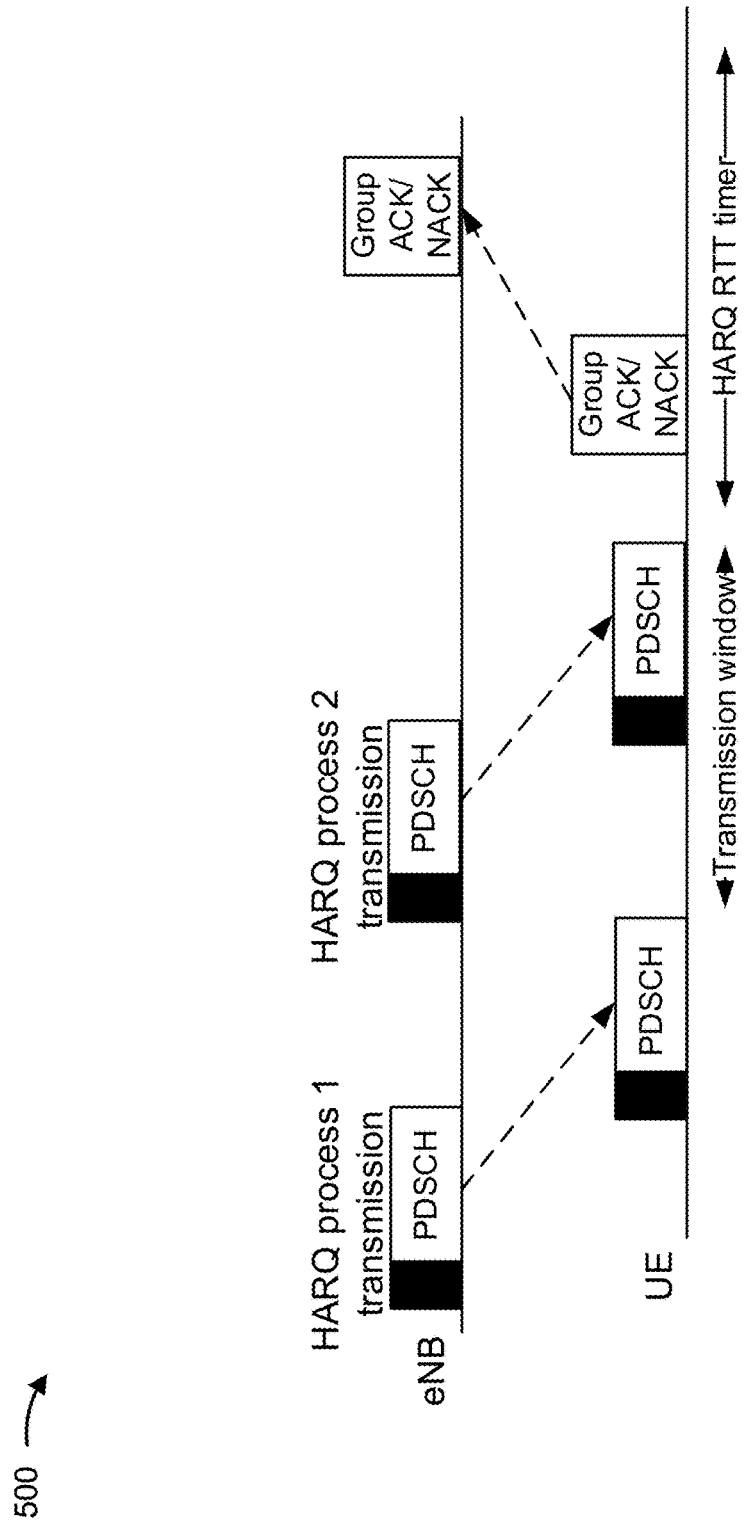
FIG. 5 is a diagram illustrating an example of using group hybrid automatic repeat request (HARQ) feedback, in accordance with various aspects of the present disclosure.

FIG. 5 is a diagram illustrating an example 500 of using group HARQ feedback, in accordance with various aspects of the present disclosure.

Example 500 shows use of a HARQ RTT timer, where the HARQ feedback is group HARQ feedback. The HARQ feedback may be an ACK or NACK for multiple HARQ processes, such as for both HARQ process 1 and HARQ process 2 shown in example 500. The HARQ RTT timer may be a downlink HARQ timer that is based at least in part on an offset. For example, the HARQ RTT timer may be k+N+offset+deltaPDCCH in duration. The group HARQ feedback may be based at least in part on PUCCH or PUSCH (e.g., medium access control control element (MAC-CE)). The group HARQ feedback may be for all HARQ processes or a bitmap that indicates certain HARQ processes.

As indicated above, FIG. 5 is provided as an example. Other examples may differ from what is described with regard to FIG. 5.

Figure 6:
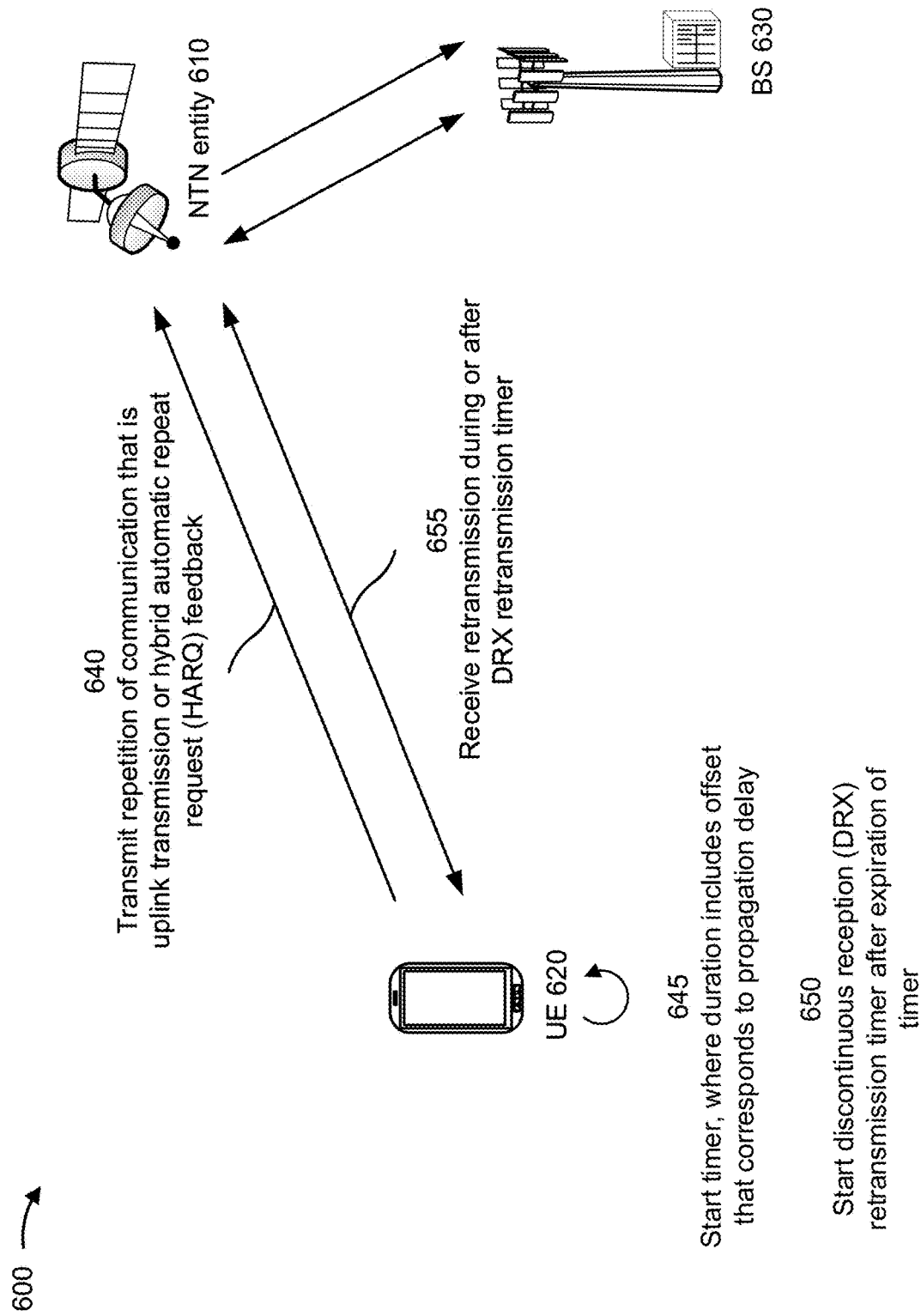
FIG. 6 is a diagram illustrating an example of using timers for enhanced coverage in an NTN, in accordance with various aspects of the present disclosure.

FIG. 6 is a diagram illustrating an example 600 of using timers for enhanced coverage in an NTN, in accordance with various aspects of the present disclosure. As shown, FIG. 6 includes an NTN entity 610 (e.g., base station, relay station), a UE 620, and a BS 630 (e.g., gNB) that may communicate with each other over satellite links. In some aspects, UE 620 may include a ground station.

As shown by reference number 640, UE 620 may transmit a communication. The communication may be an uplink transmission or HARQ feedback for a downlink transmission. As shown by reference number 645, UE 620 may start a timer. The timer may be for retransmission scheduling or for HARQ feedback. The duration of the timer may be a value that corresponds to a propagation delay between UE 620 and BS 630 via NTN entity 610. The duration of the timer may be referred to as an "offset" value. The timer may be a HARQ RTT timer that is a duration of the offset or that is extended by the offset.

As shown by reference number 650, after the timer expires, UE 620 may start a DRX timer. The DRX timer may be a DRX retransmission timer. As shown by reference number 655, UE 620 may receive a retransmission during the DRX retransmission timer. UE 620 may transmit a retransmission after the DRX retransmission timer expires if the UE receives a HARQ NACK (or no response depending on the configuration).

As indicated above, FIG. 6 is provided as an example. Other examples may differ from what is described with regard to FIG. 6.

Figure 7:
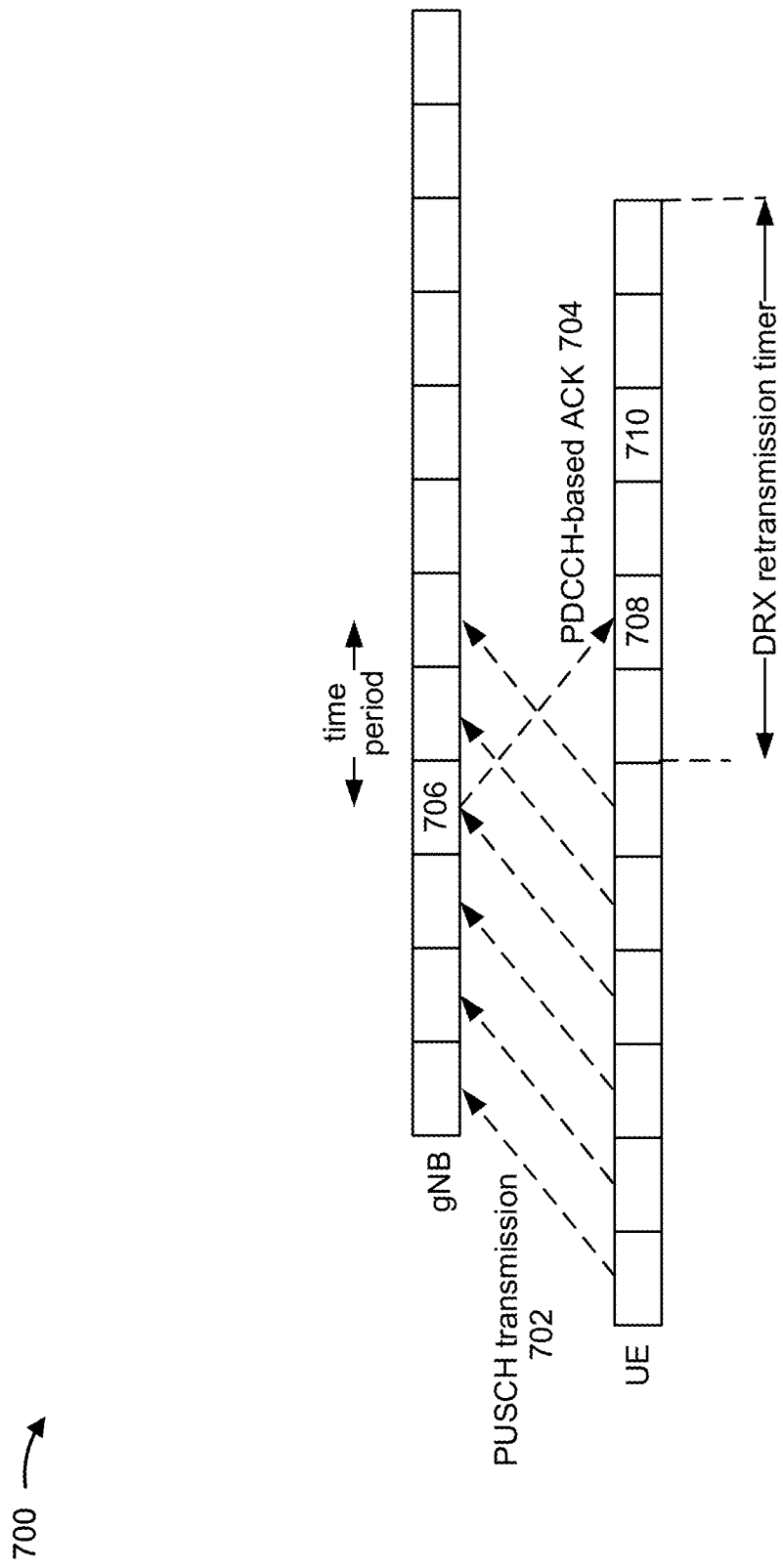
FIG. 7 is a diagram illustrating an example of early transmission for a discontinuous reception (DRX) retransmission timer, in accordance with various aspects of the present disclosure.

FIG. 7 is a diagram illustrating an example 700 of early transmission for a DRX retransmission timer, in accordance with various aspects of the present disclosure.

In some scenarios, PDCCH-based HARQ feedback may be supported if a UE is an eMTC device operating in FD mode. In some aspects, PDCCH-based HARQ feedback may be used by an eMTC device operating in HD mode or by an NB-IoT device (which operates in HD mode) to improve throughput (i.e., by reducing latency) if a DRX retransmission timer is modified. For example, the UE may not use a HARQ RTT timer and may start a DRX retransmission timer after a last repetition of a PUSCH transmission 702, as shown by example 700. A gNB may transmit PDCCH-based HARQ ACK 704 at time slot 706. The UE may receive PDCCH-based HARQ ACK 704 (or a new HARQ transmission grant) from the gNB without waiting for a HARQ RTT timer to expire. PDCCH-based HARQ ACK 704 may have been transmitted at time slot 706, to be received at time slot 708 rather than at time slot 710. The gNB may determine an estimate of the propagation delay and estimate that time slot 706 is earlier than reception of the last repetition by an amount that is equal to or greater than the propagation delay. Time slot 706 may also be a time slot in which the last repetition is transmitted. In some aspects, time slot 708 may be within a duration of the propagation delay after transmitting the last repetition. In this way, the UE may receive HARQ feedback earlier for the DRX retransmission timer. In fact, PDCCH-based HARQ ACK 704 or an uplink grant for a new transmission may arrive at the UE as soon as the UE finishes PUSCH transmission. This can be done if the gNB estimates the propagation delay. PDCCH-based HARQ ACK 704 or an uplink grant for a new transmission may be received after the last repetition was transmitted or a time period after a first repetition of the repetitions was transmitted, whichever is later. By receiving HARQ feedback earlier during the DRX retransmission timer, due to an earlier transmission of the HARQ feedback by the gNB, the UE may increase throughput with the NTN. Increased throughout conserves signaling resources and improves the quality of the communication.

As indicated above, FIG. 7 is provided as an example. Other examples may differ from what is described with regard to FIG. 7.

Figure 8:
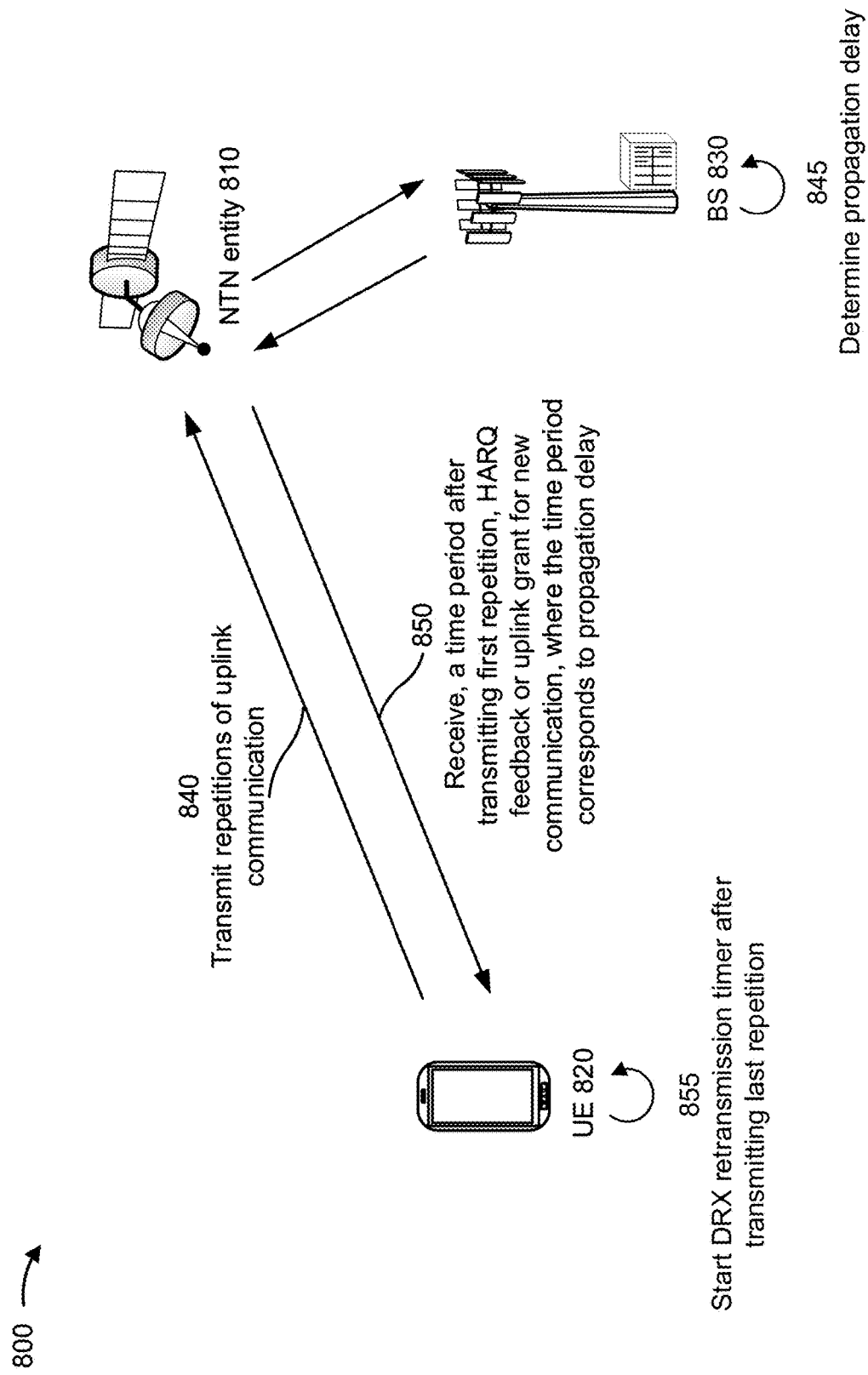
FIG. 8 is a diagram illustrating an example of early transmission for a DRX retransmission timer, in accordance with various aspects of the present disclosure.

FIG. 8 is a diagram illustrating an example 800 of early transmission for a DRX retransmission timer, in accordance with various aspects of the present disclosure. As shown, FIG. 8 includes an NTN entity 810 (e.g., base station, relay station), UE 820, and BS 830 that may communicate with each other over satellite links. In some aspects, UE 820 may include a ground station.

As shown by reference number 840, UE 820 may transmit repetitions of an uplink communication on a PUSCH. As shown by reference number 845, BS 830 may determine a propagation delay between UE 820 and BS 830 via NTN entity 810. For example, BS 830 may estimate the propagation delay based at least in part on previous transmissions of uplink grants or HARQ feedback, a DRX inactivity timer duration or a DRX retransmission timer configured at UE 820, and/or a time that a new transmission or HARQ feedback is received.

Sometime before the last repetition of the uplink communication is transmitted by UE 820, BS 830 may transmit HARQ feedback or an uplink grant for a new communication. BS 830 may transmit the HARQ feedback or the uplink grant before UE 820 is expected to transmit the last repetition (when a DRX retransmission timer is started). UE 820 may then receive the HARQ feedback or the uplink grant a time period after transmitting a first repetition, as shown by reference number 850. The time period may be less than the propagation delay, which indicates that BS 830 transmitted the HARQ feedback or uplink grant early, based at least in part on the propagation delay. Early HARQ feedback transmission saves time and increases throughput.

As shown by reference number 855, UE 820 may start a DRX timer after transmitting a last repetition. The DRX timer may be a DRX retransmission timer.

As indicated above, FIG. 8 is provided as an example. Other examples may differ from what is described with regard to FIG. 8.

Figure 9:
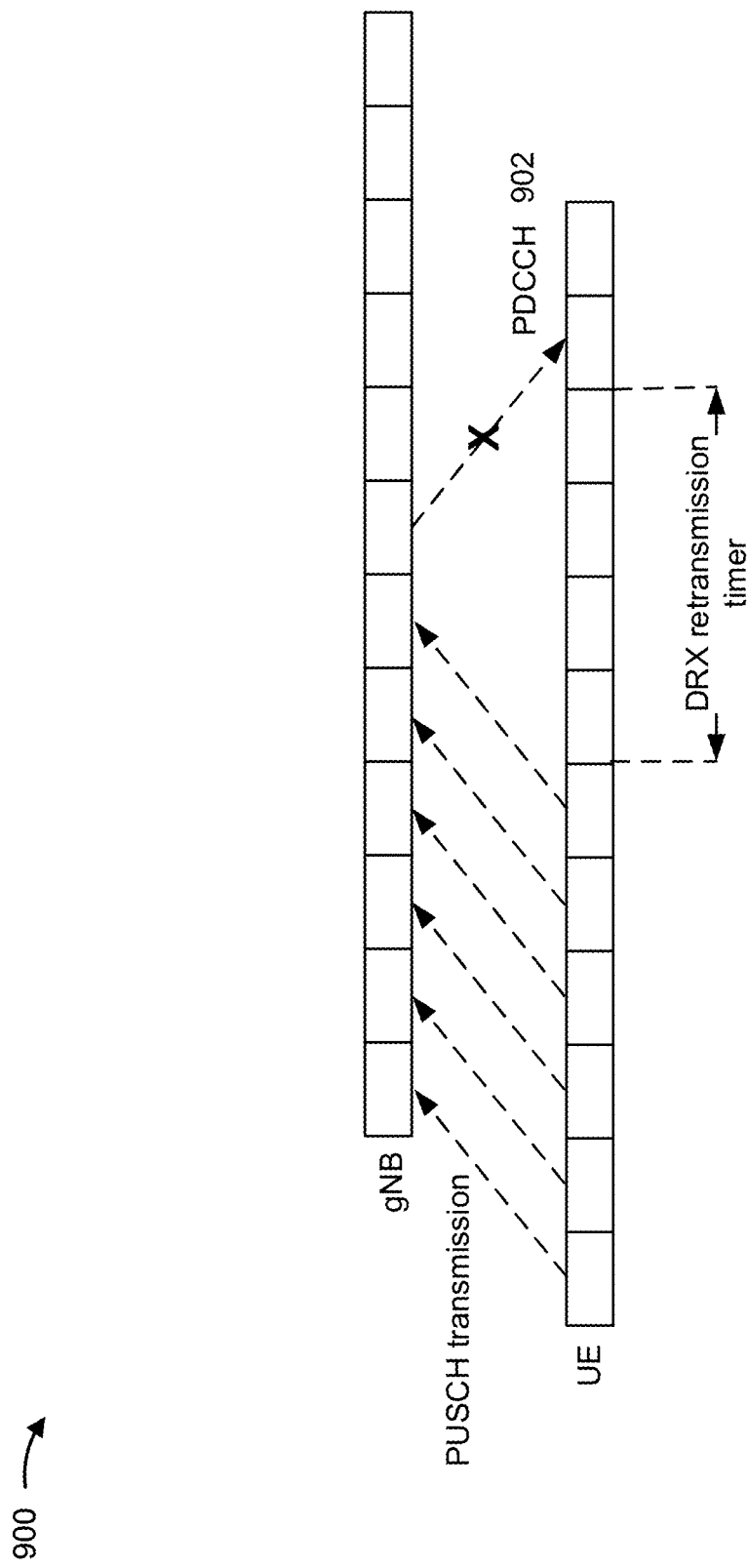
FIG. 9 is a diagram illustrating an example of using early transmission for a DRX retransmission timer, in accordance with various aspects of the present disclosure.

FIG. 9 is a diagram illustrating an example 900 of using early transmission for a DRX retransmission timer, in accordance with various aspects of the present disclosure.

In some scenarios, a base station may not send PDCCH-based HARQ feedback if all repetitions of a PUSCH are to be decoded for successful reception (applicable to both HD and FD). If a HARQ RTT timer is not used, a DRX retransmission timer may not be long enough to account for a long propagation delay with an NTN, as shown by the "X" for PDCCH communication 902 in example 900. For example, a maximum value for a DRX retransmission timer may be less than the propagation delay for an eMTC device or an NB-IoT device.

In some aspects, a UE may delay start of the DRX retransmission timer by an offset. The offset may correspond to the propagation delay. In some aspects, the DRX retransmission timer may be extended by the offset. In some aspects, the DRX retransmission timer may be configured with longer value ranges that are based at least in part on propagation delay estimates or estimated ranges. In this way, a UE may not miss PDCCH communication 902. To save power, the UE may monitor the PDCCH with a larger periodicity when the DRX retransmission timer is configured to be longer.

As indicated above, FIG. 9 is provided as an example. Other examples may differ from what is described with regard to FIG. 9.

Figure 10:
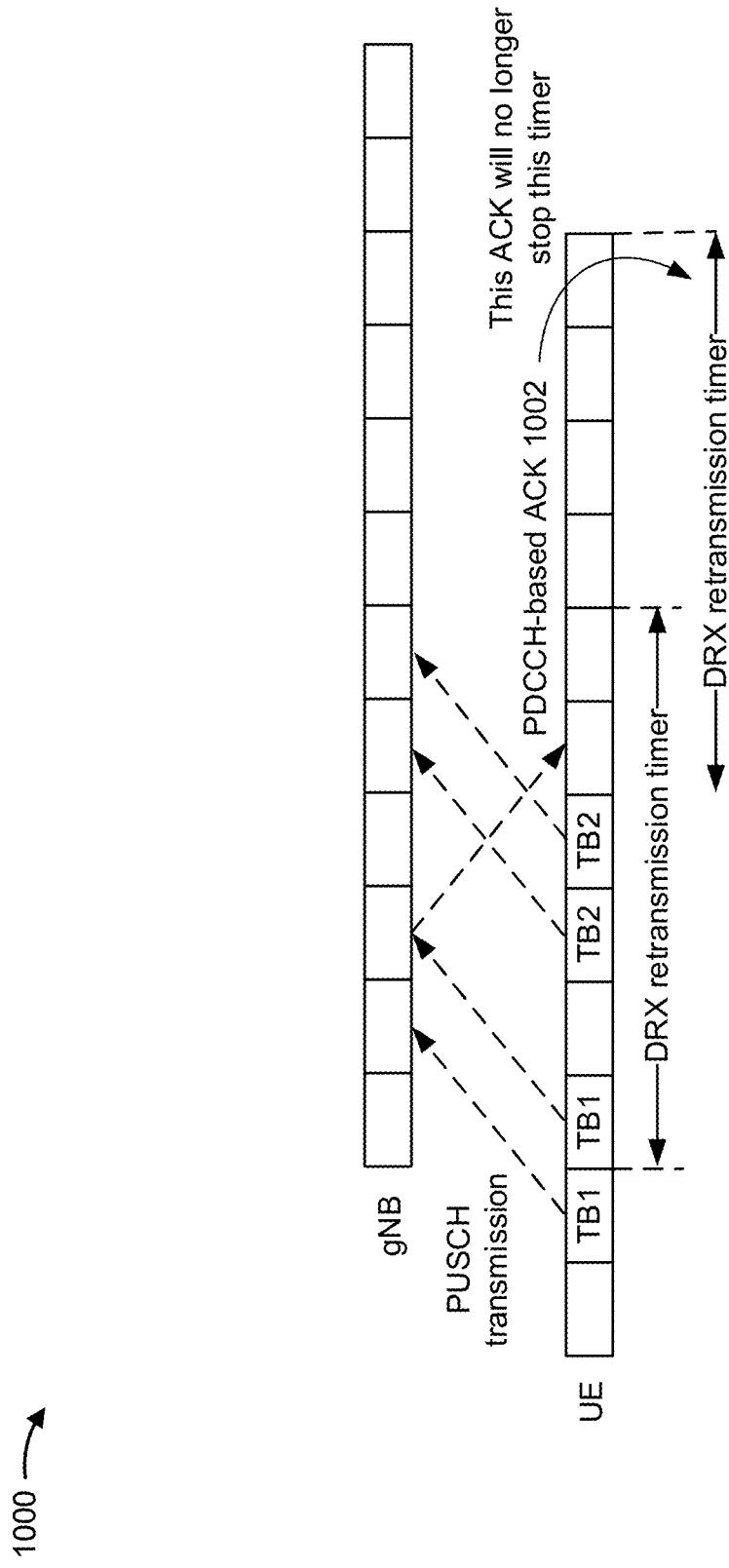
FIG. 10 is a diagram illustrating an example of HARQ feedback signaling, in accordance with various aspects of the present disclosure.

FIG. 10 is a diagram illustrating an example 1000 of HARQ feedback signaling, in accordance with various aspects of the present disclosure. Example 1000 shows a UE that transmits repetitions for a first transport block (TB1) and for a second transport block (TB2).

When PDCCH-based HARQ feedback is configured, a UE may stop a DRX retransmission timer for all completed PUSCH transmissions (applicable to both HD and FD). However, due to a long propagation delay, a gNB may transmit PDCCH-based HARQ feedback (e.g., ACK) 1002 for TB1 before completing transmission of a PUSCH communication for TB2. When PDCCH-based HARQ feedback 1002 for TB1 reaches the UE, repetitions for TB2 may be on-going. PDCCH-based HARQ feedback 1002 for TB1 may falsely force the UE to stop the DRX retransmission timer for TB2 and falsely terminate further repetitions for TB2.

In some aspects, the UE may modify the PDCCH-based HARQ feedback to include an indication of whether the HARQ feedback corresponds to all HARQ processes or only a first HARQ process that has a DRX retransmission timer running For example, the UE may use a frequency hopping flag set to "1" to indicate that the UE has a three bit field for a HARQ process number and/or a next three bits that indicate a HARQ process ID. If the frequency hopping flag is set to "0", then there is no change in the HARQ feedback procedure.

In some aspects, the UE may determine the HARQ process for which HARQ feedback is directed based at least in part on an offset that corresponds to the propagation delay. For example, the UE may determine that a PUSCH transmission was made at least at a $(n-K_{offset})$ time slot (e.g., subframe), where n is the time slot of reception of HARQ feedback and $K_{offset}$ corresponds to the propagation delay. In other words, the UE may use a propagation delay to trace back from HARQ feedback to identify a HARQ process. The UE may stop the DRX retransmission timer for that HARQ process if the DRX retransmission timer is running or not start the DRX retransmission timer if the DRX retransmission timer is not running. By not falsely stopping DRX retransmission timers for other HARQ processes, the UE may improve communications and conserve processing resources and signaling resources that would otherwise be wasted with additional retransmissions.

As indicated above, FIG. 10 is provided as an example. Other examples may differ from what is described with regard to FIG. 10.

Figure 11:
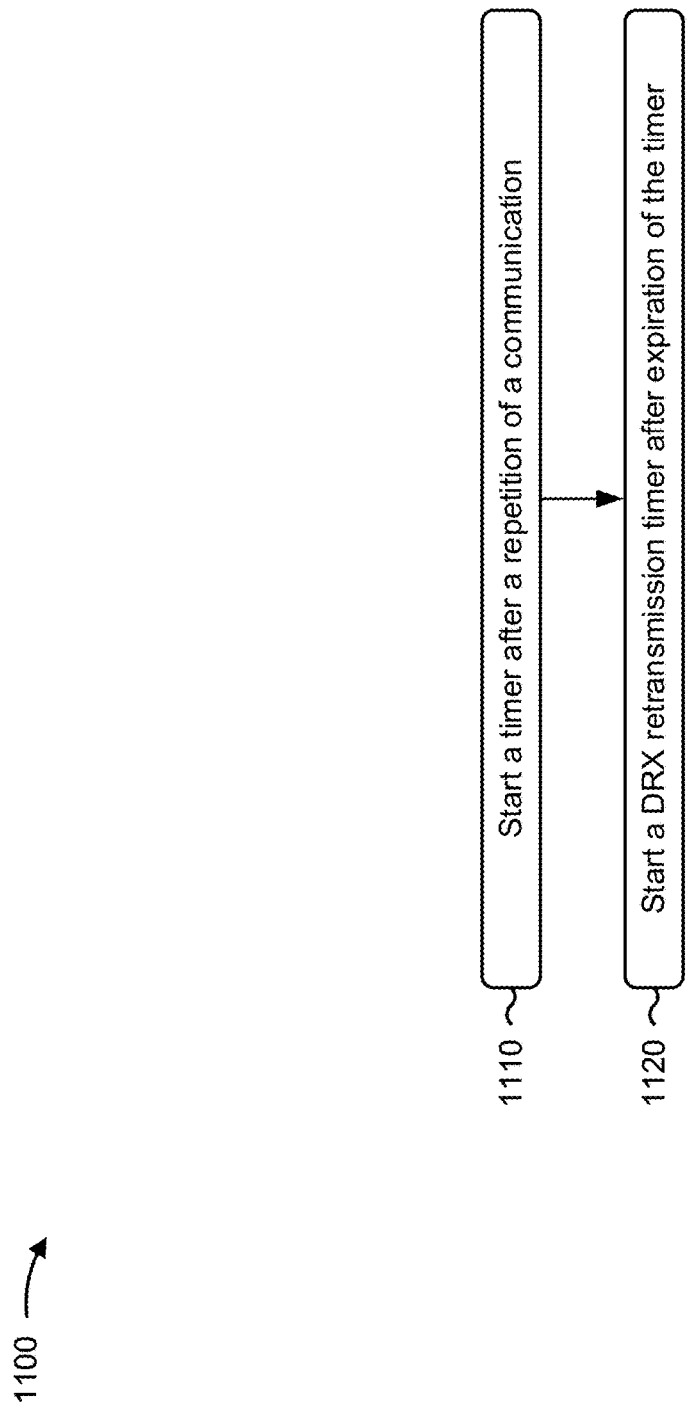
FIG. 11 is a diagram illustrating an example process performed, for example, by a UE, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120 depicted in FIGS. 1-3, the UE in FIGS. 4-5, UE 620 depicted in FIG. 6) performs operations associated with timers for enhanced coverage with an NTN.

As shown in FIG. 11, in some aspects, process 1100 may include starting a timer after a repetition of a communication (block 1110). For example, the UE (e.g., using timer component 1408 depicted in FIG. 14) may start a timer after a repetition of a communication, as described above. In some aspects, a duration of the timer includes an offset that corresponds to a propagation delay between the UE and a base station via an NTN entity. In some aspects, the timer may be started after transmitting the communication or after receiving the communication. In some aspects, the timer may be a timer for retransmission scheduling.

As further shown in FIG. 11, in some aspects, process 1100 may include starting a DRX timer after expiration of the timer (block 1120). For example, the UE (e.g., using timer component 1408 depicted in FIG. 14) may start a DRX timer after expiration of the timer, as described above. The DRX timer may be a DRX retransmission timer.

Process 1100 may include additional aspects, such as any single aspect or any combination of aspects described below and/or in connection with one or more other processes described elsewhere herein.

In a first aspect, the UE is an eMTC operating in half duplex mode or an NB-IoT device.

In a second aspect, alone or in combination with the first aspect, the communication includes HARQ feedback for a downlink communication.

In a third aspect, alone or in combination with one or more of the first and second aspects, the communication includes an uplink communication on a physical uplink shared channel or a downlink communication on a PDSCH.

In a fourth aspect, alone or in combination with one or more of the first through third aspects, the timer is not a HARQ RTT and the duration is equal to the offset.

In a fifth aspect, alone or in combination with one or more of the first through fourth aspects, the timer is a HARQ RTT that is extended by the offset. In some aspects, the offset replaces a constant value used in calculation of RTT length.

In a sixth aspect, alone or in combination with one or more of the first through fifth aspects, the HARQ feedback includes group HARQ feedback.

In a seventh aspect, alone or in combination with one or more of the first through sixth aspects, the repetition of the communication is a first repetition or a specified repetition number among repetitions for the communication.

In an eighth aspect, alone or in combination with one or more of the first through seventh aspects, the DRX retransmission timer is started after the last repetition of the communication if the timer expires before the last repetition.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
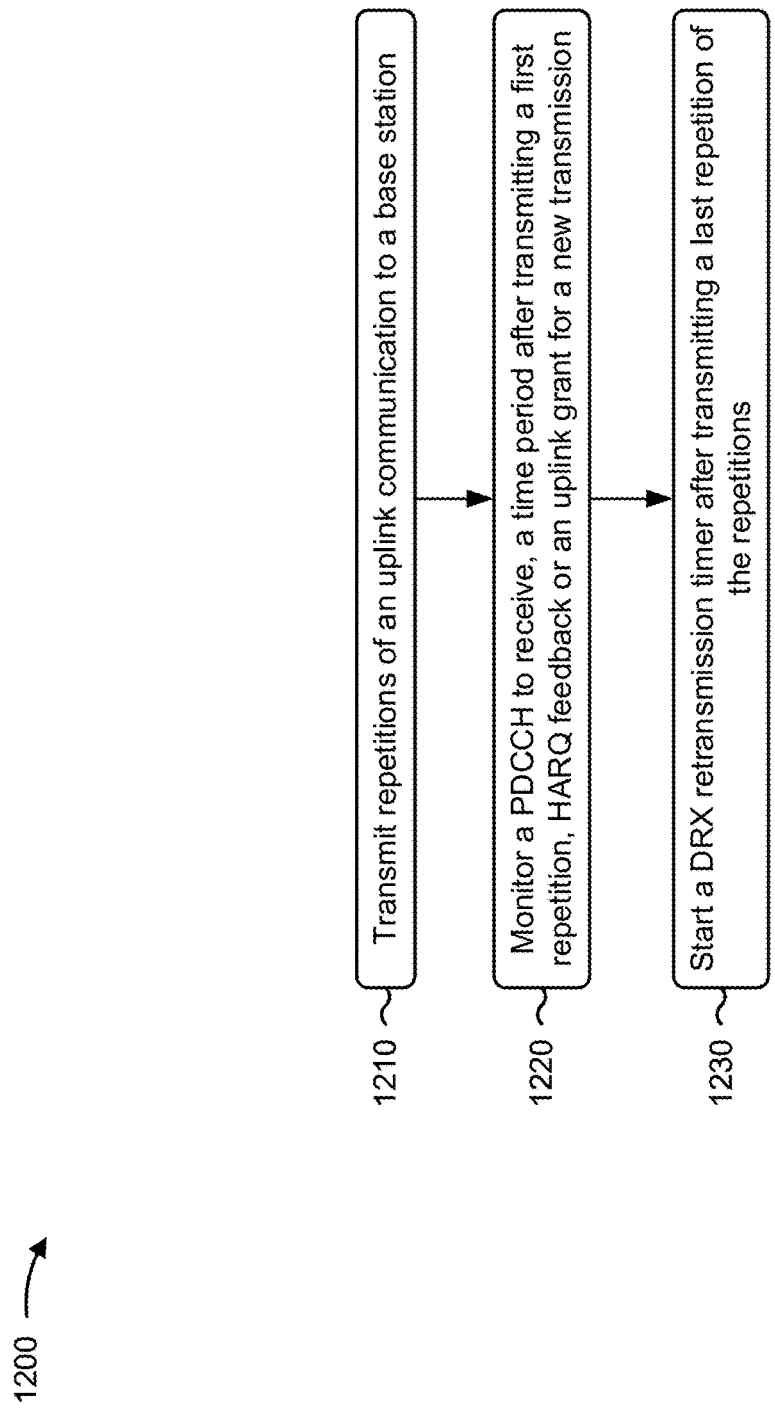
FIG. 12 is a diagram illustrating an example process performed, for example, by a UE, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 depicted in FIGS. 1-3, the UE depicted in FIGS. 7 and 9-10, UE 820 depicted in FIG. 8) performs operations associated with timers for enhanced coverage with an NTN.

As shown in FIG. 12, in some aspects, process 1200 may include transmitting repetitions of an uplink communication to a base station (block 1210). For example, the UE (e.g., using transmission component 1504 depicted in FIG. 15) may transmit repetitions of an uplink communication to a base station, as described above.

As further shown in FIG. 12, in some aspects, process 1200 may include monitoring a PDCCH to receive, a time period after transmitting a first repetition of the repetitions, HARQ feedback or an uplink grant for a new transmission (block 1220). For example, the UE (e.g., using reception component 1502 depicted in FIG. 15) may monitor a PDCCH to receive, a time period after transmitting a first repetition of the repetitions, HARQ feedback or an uplink grant for a new transmission, as described above. In some aspects, the time period corresponds to a propagation delay to the base station via a NTN entity.

As further shown in FIG. 12, in some aspects, process 1200 may include starting a DRX retransmission timer after transmitting a last repetition of the repetitions (block 1230). For example, the UE (e.g., using timer component 1508 depicted in FIG. 15) may start a DRX retransmission timer after transmitting a last repetition of the repetitions, as described above.

Process 1200 may include additional aspects, such as any single aspect or any combination of aspects described below and/or in connection with one or more other processes described elsewhere herein.

In a first aspect, receiving the HARQ feedback or the uplink grant includes receiving the HARQ feedback or the uplink grant within two time slots after the last repetition was transmitted or a time period after a first repetition of the repetitions was transmitted, whichever is later. In some aspects, receiving the HARQ feedback or the uplink grant includes receiving the HARQ feedback or the uplink grant within two time slots after the last repetition was transmitted.

In a second aspect, alone or in combination with the first aspect, starting the DRX retransmission timer includes starting the DRX retransmission timer after the time period that is based at least in part on the propagation delay.

In a third aspect, alone or in combination with one or more of the first and second aspects, starting the DRX retransmission timer includes extending the DRX retransmission timer by an offset that is based at least in part on the propagation delay.

In a fourth aspect, alone or in combination with one or more of the first through third aspects, the DRX retransmission timer has a duration that is based at least in part on the propagation delay.

In a fifth aspect, alone or in combination with one or more of the first through fourth aspects, process 1200 includes stopping the DRX retransmission timer, if running, or not starting the DRX retransmission timer, if not running, based at least in part on receiving an indication that the HARQ feedback corresponds to all HARQ processes associated with the DRX retransmission timer.

In a sixth aspect, alone or in combination with one or more of the first through fifth aspects, process 1200 includes determining a HARQ process to which the HARQ feedback corresponds based at least in part on the propagation delay and stopping the DRX retransmission timer associated with the HARQ process.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
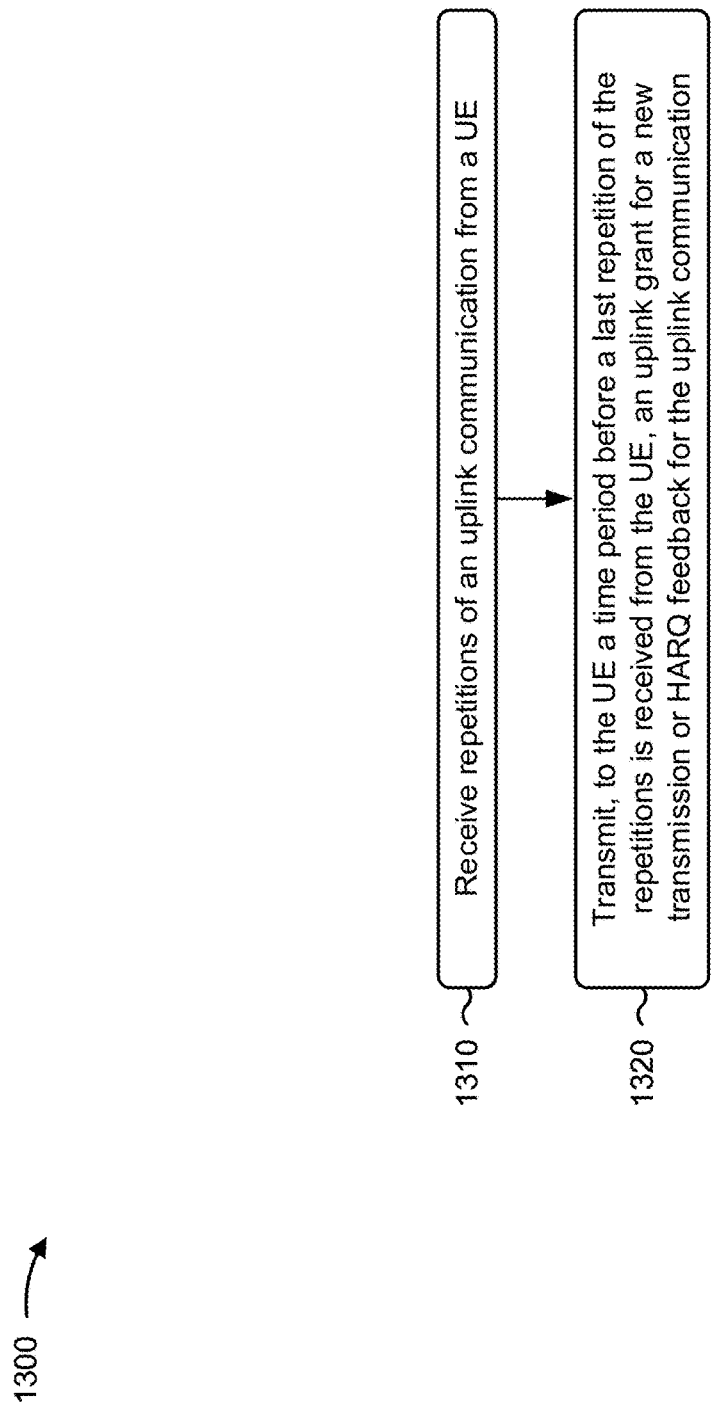
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., base station 110 depicted in FIGS. 1-2, satellite 340 or gateway 350 depicted in FIG. 3, the gNB depicted in FIGS. 7 and 9-10, BS 830 depicted in FIG. 8) performs operations associated with timers for enhanced coverage with an NTN.

As shown in FIG. 13, in some aspects, process 1300 may include receiving repetitions of an uplink communication from a UE (block 1310). For example, the base station (e.g., using reception component 1602 depicted in FIG. 16) may receive repetitions of an uplink communication from a UE, as described above.

As further shown in FIG. 13, in some aspects, process 1300 may include transmitting, to the UE a time period before a last repetition of the repetitions is received from the UE, an uplink grant for a new transmission or HARQ feedback for the uplink communication (block 1320). For example, the base station (e.g., using transmission component 1604 depicted in FIG. 16) may transmit, to the UE a time period before a last repetition of the repetitions is received from the UE, an uplink grant for a new transmission or HARQ feedback for the uplink communication, as described above. In some aspects, the time period is based at least in part on a propagation delay between the UE and the base station via an NTN entity.

Process 1300 may include additional aspects, such as any single aspect or any combination of aspects described below and/or in connection with one or more other processes described elsewhere herein.

In a first aspect, the time period is equal to or greater than the propagation delay.

In a second aspect, alone or in combination with the first aspect, the uplink grant or the HARQ feedback is transmitted by the base station such that the uplink grant or the HARQ feedback is received by the UE after the last repetition was transmitted by the UE or a second time period after a first repetition of the repetitions was transmitted, whichever is later. In some aspects, the uplink grant or the HARQ feedback is transmitted by the base station such that the uplink grant or the HARQ feedback is received by the UE within two time slots after the last repetition was transmitted by the UE.

In a third aspect, alone or in combination with one or more of the first and second aspects, process 1300 includes transmitting an indication that the HARQ feedback corresponds to a specific HARQ process associated with a DRX retransmission timer. In some aspects, process 1300 includes transmitting an indication that the HARQ feedback corresponds to all HARQ processes associated with a DRX retransmission timer.

In a fourth aspect, alone or in combination with one or more of the first through third aspects, process 1300 includes transmitting an indication that the HARQ feedback is for a first HARQ process associated with a DRX retransmission timer.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
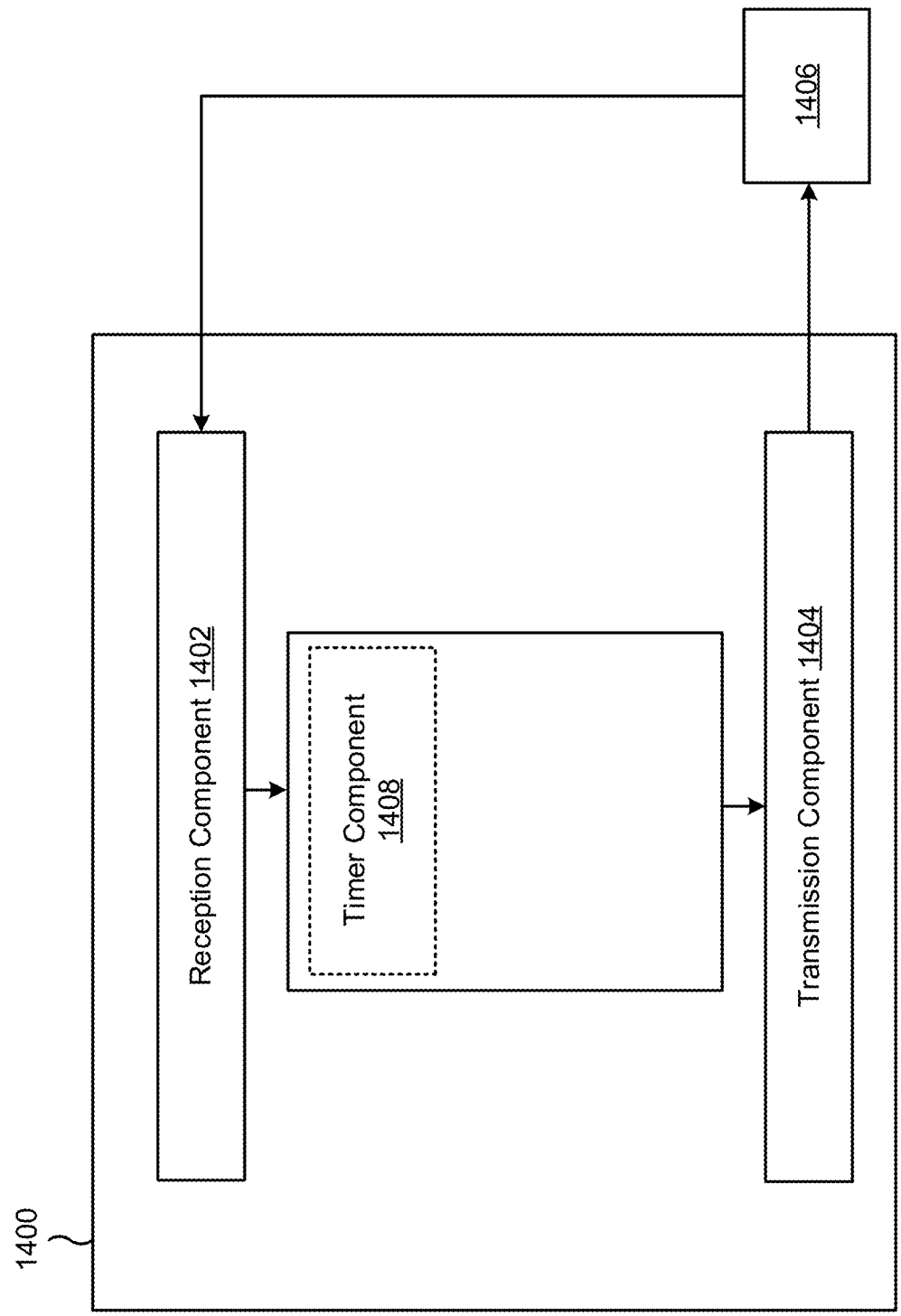
FIGS. 14-16 are block diagrams of example apparatuses for wireless communication, in accordance with various aspects of the present disclosure.

FIG. 14 is a block diagram of an example apparatus 1400 for wireless communication. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include a timer component 1408, among other examples.

In some aspects, the apparatus 1400 may be configured to perform one or more operations described herein in connection with FIGS. 1-10. Additionally, or alternatively, the apparatus 1400 may be configured to perform one or more processes described herein, such as process 1100 of FIG. 11, or a combination thereof. In some aspects, the apparatus 1400 and/or one or more components shown in FIG. 14 may include one or more components of the UE described above in connection with FIG. 2. Additionally, or alternatively, one or more components shown in FIG. 14 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1406. In some aspects, the reception component 1402 may include one or more antennas, a demodulator, a MIMO detector, a receive processor, a controller/processor, a memory, or a combination thereof, of the UE described above in connection with FIG. 2.

The transmission component 1404 may transmit communications, such as reference signals, control information, data communications, or a combination thereof, to the apparatus 1406. In some aspects, one or more other components of the apparatus 1406 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modulator, a transmit MIMO processor, a transmit processor, a controller/processor, a memory, or a combination thereof, of the UE described above in connection with FIG. 2. In some aspects, the transmission component 1404 may be co-located with the reception component 1402 in a transceiver.

The timer component 1408 may start a timer after a repetition of a communication, where calculation of a length of the timer includes an offset that corresponds to a propagation delay between the UE and a base station via an NTN entity. The timer component 1408 may start a DRX retransmission timer after expiration of the timer.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
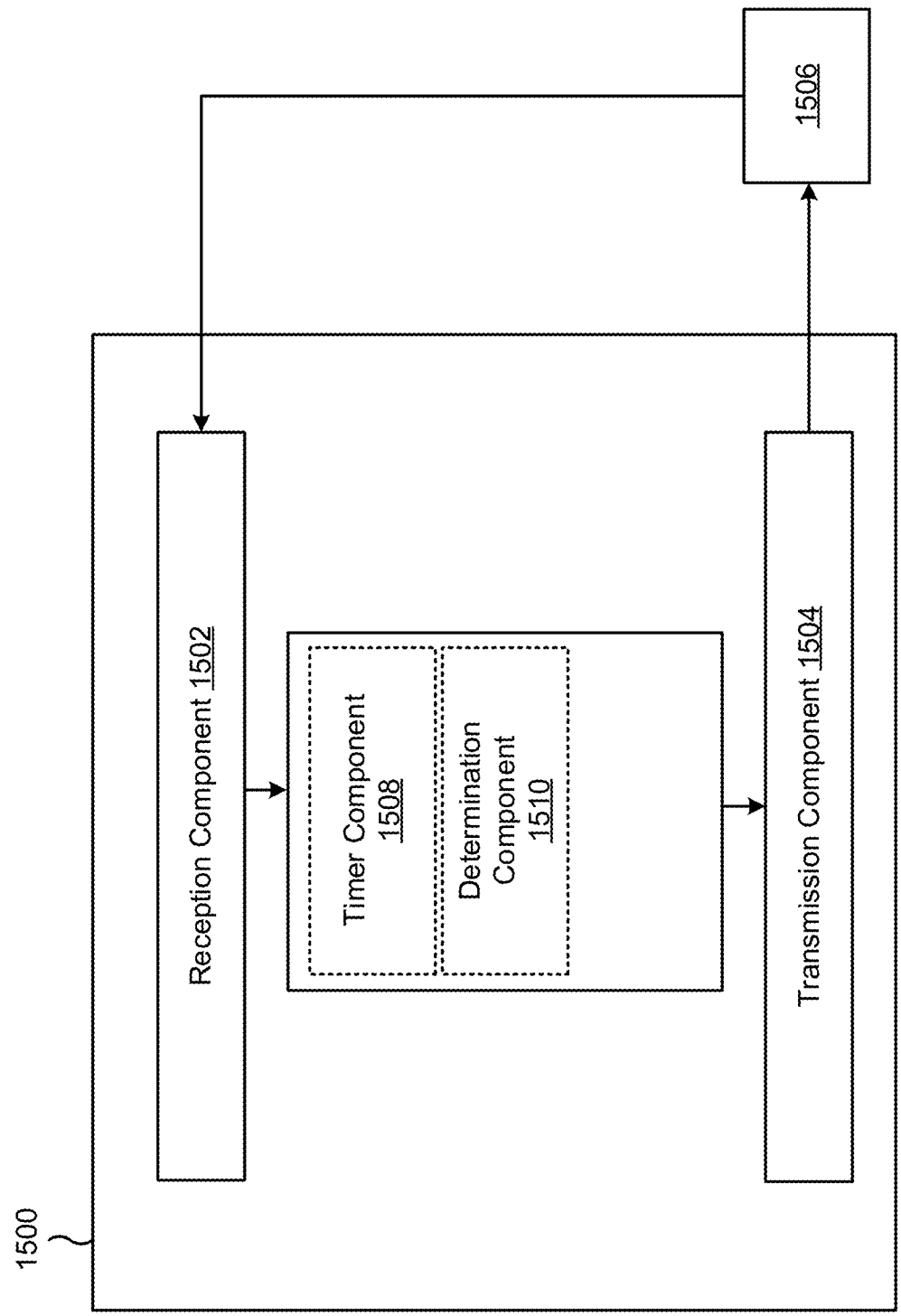

FIG. 15 is a block diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include a timer component 1508 and/or a determination component 1510, among other examples.

In some aspects, the apparatus 1500 may be configured to perform one or more operations described herein in connection with FIGS. 1-10. Additionally, or alternatively, the apparatus 1500 may be configured to perform one or more processes described herein, such as process 1200 of FIG. 12. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The transmission component 1504 may transmit repetitions of an uplink communication to a base station. The reception component 1502 may monitor a physical downlink control channel to receive, a time period after transmitting a first repetition of the repetitions, HARQ feedback or an uplink grant for a new transmission, where the time period is less than a propagation delay to the base station via an NTN entity. The timer component 1508 may start a DRX retransmission timer after transmitting a last repetition of the repetitions.

The timer component 1508 may stop the DRX retransmission timer, if running, or to not start the DRX retransmission timer, if not running, based at least in part on receiving an indication from control channel bits indicating that the HARQ feedback corresponds to a specific HARQ process associated with the DRX retransmission timer. The determination component 1510 may determine a HARQ process to which the HARQ feedback corresponds based at least in part on the propagation delay. The timer component 1508 may stop the DRX retransmission timer associated with the HARQ process.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

Figure 16:
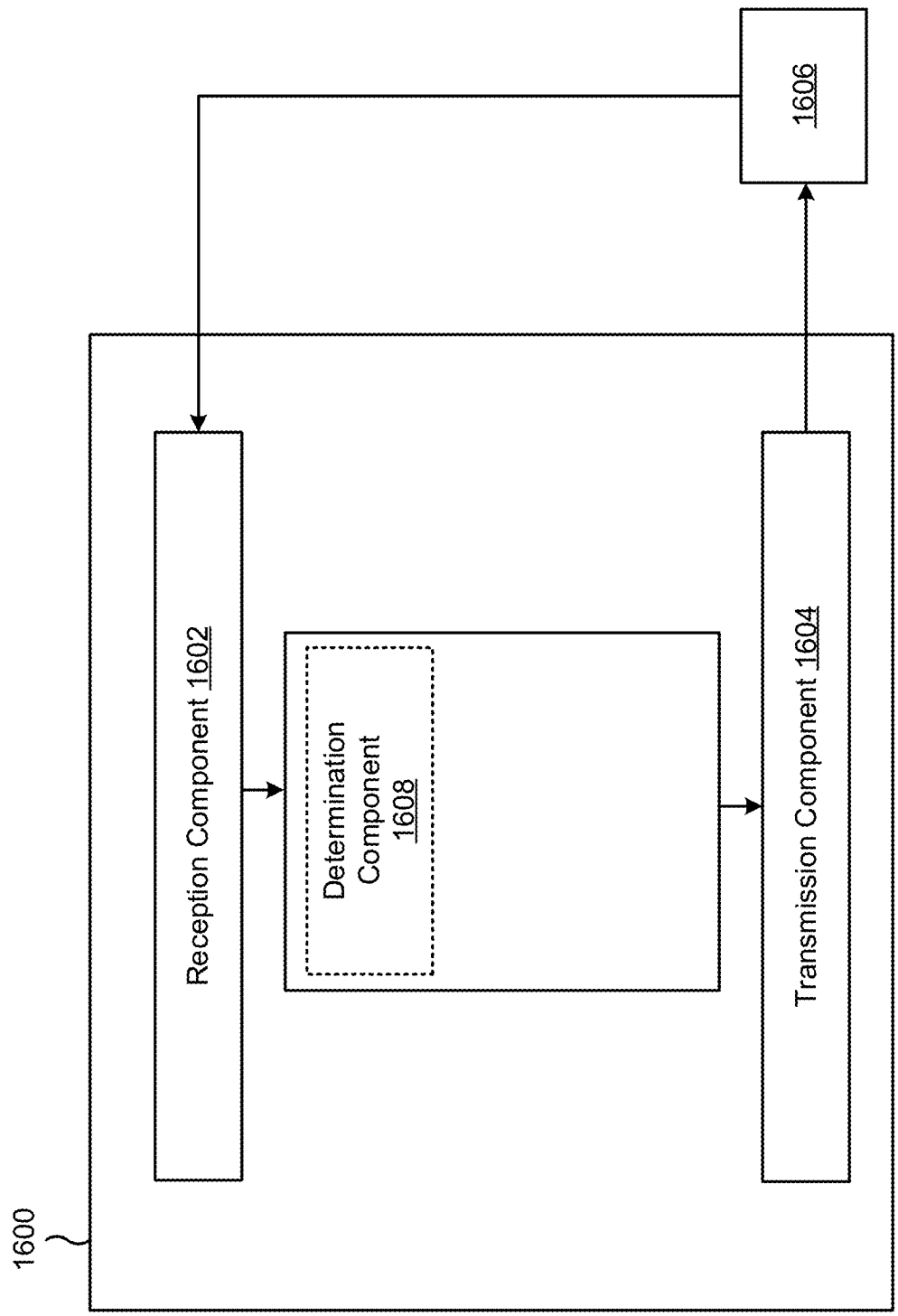

FIG. 16 is a block diagram of an example apparatus 1600 for wireless communication. The apparatus 1600 may be a base station, or a base station may include the apparatus 1600. In some aspects, the apparatus 1600 includes a reception component 1602 and a transmission component 1604, which may be in communication with one another (for example, via one or more buses and/or one or more other components). As shown, the apparatus 1600 may communicate with another apparatus 1606 (such as a UE, a base station, or another wireless communication device) using the reception component 1602 and the transmission component 1604. As further shown, the apparatus 1600 may include one or more of a determination component 1608, among other examples.

In some aspects, the apparatus 1600 may be configured to perform one or more operations described herein in connection with FIGS. 1-10. Additionally, or alternatively, the apparatus 1600 may be configured to perform one or more processes described herein, such as process 1300 of FIG. 13. In some aspects, the apparatus 1600 and/or one or more components shown in FIG. 16 may include one or more components of the base station described above in connection with FIG. 2. Additionally, or alternatively, one or more components shown in FIG. 16 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1602 may receive communications, such as reference signals, control information, data communications, or a combination thereof, from the apparatus 1606. The reception component 1602 may provide received communications to one or more other components of the apparatus 1600. In some aspects, the reception component 1602 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1606. In some aspects, the reception component 1602 may include one or more antennas, a demodulator, a MIMO detector, a receive processor, a controller/processor, a memory, or a combination thereof, of the base station described above in connection with FIG. 2.

The transmission component 1604 may transmit communications, such as reference signals, control information, data communications, or a combination thereof, to the apparatus 1606. In some aspects, one or more other components of the apparatus 1606 may generate communications and may provide the generated communications to the transmission component 1604 for transmission to the apparatus 1606. In some aspects, the transmission component 1604 may perform signal processing on the generated communications (such as filtering, amplification, modulation, digital-to-analog conversion, multiplexing, interleaving, mapping, or encoding, among other examples), and may transmit the processed signals to the apparatus 1606. In some aspects, the transmission component 1604 may include one or more antennas, a modulator, a transmit MIMO processor, a transmit processor, a controller/processor, a memory, or a combination thereof, of the base station described above in connection with FIG. 2. In some aspects, the transmission component 1604 may be co-located with the reception component 1602 in a transceiver.

The reception component 1602 may receive repetitions of an uplink communication from a UE. The transmission component 1604 may transmit, to the UE a time period before a last repetition of the repetitions is received from the UE, an uplink grant for a new transmission or HARQ feedback for the uplink communication, where the time period is based at least in part on a propagation delay between the UE and the base station via an NTN entity. The determination component 1608 may determine the propagation delay.

The transmission component 1604 may transmit an indication that the HARQ feedback corresponds to a specific HARQ process associated with a DRX retransmission timer or an indication that the HARQ feedback corresponds to all HARQ processes associated with the DRX retransmission timer. The transmission component 1604 may transmit an indication that the HARQ feedback is for a first HARQ process associated with a DRX retransmission timer.

The number and arrangement of components shown in FIG. 16 are provided as an example. In practice, there may be additional components, fewer components, different components, or differently arranged components than those shown in FIG. 16. Furthermore, two or more components shown in FIG. 16 may be implemented within a single component, or a single component shown in FIG. 16 may be implemented as multiple, distributed components. Additionally, or alternatively, a set of (one or more) components shown in FIG. 16 may perform one or more functions described as being performed by another set of components shown in FIG. 16.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some aspects of the present disclosure:

Aspect 1: A method of wireless communication performed by a user equipment (UE), comprising: starting a timer after a repetition of a communication, wherein calculation of a length of the timer includes an offset that corresponds to a propagation delay between the UE and a base station via a non-terrestrial network (NTN) entity; and starting a discontinuous reception (DRX) retransmission timer after expiration of the timer.

Aspect 2: The method of claim 1, wherein the repetition of the communication is a first repetition or a specified repetition number among repetitions for the communication.

Aspect 3: The method of aspect 1 or 2, wherein the UE is an enhanced machine type communication device operating in half duplex mode or a narrowband internet-of-things device.

Aspect 4: The method of any of aspects 1-3, wherein the communication includes hybrid automatic repeat request (HARQ) feedback for a downlink communication.

Aspect 5: The method of any of aspects 1-4, wherein the communication includes an uplink communication on a physical uplink shared channel or a downlink communication on physical downlink shared channel.

Aspect 6: The method of any of aspects 1-5, wherein the DRX retransmission timer is started after the last repetition of the communication if the timer expires before the last repetition.

Aspect 7: The method of any of aspects 1-6, wherein the timer is not a hybrid automatic repeat request (HARQ) round trip timer (RTT) and the duration is equal to the offset.

Aspect 8: The method of any of aspects 1-6, wherein the timer is a hybrid automatic repeat request (HARQ) round trip timer (RTT) that is extended by the offset, wherein the offset replaces a constant value used in calculation of RTT length.

Aspect 9: The method of any of aspects 1-8, wherein the hybrid automatic repeat request (HARQ) feedback includes group HARQ feedback.

Aspect 10: A method of wireless communication performed by a user equipment (UE), comprising: transmitting repetitions of an uplink communication to a base station; monitoring a physical downlink control channel to receive, a time period after transmitting a first repetition of the repetitions, hybrid automatic repeat request (HARQ) feedback or an uplink grant for a new transmission, wherein the time period corresponds to a propagation delay to the base station via a non-terrestrial network (NTN) entity; and starting a discontinuous reception (DRX) retransmission timer after transmitting a last repetition of the repetitions.

Aspect 11: The method of aspect 10, wherein receiving the HARQ feedback or the uplink grant includes receiving the HARQ feedback or the uplink grant after the last repetition was transmitted or a time period after a first repetition of the repetitions was transmitted, whichever is later.

Aspect 12: The method of aspect 10 or 11, wherein starting the DRX retransmission timer includes starting the DRX timer after a time delay that is based at least in part on the propagation delay.

Aspect 13: The method of any of aspects 10-12, wherein starting the DRX retransmission timer includes extending the DRX timer by an offset that is based at least in part on the propagation delay.

Aspect 14: The method of any of aspects 10-13, wherein the DRX timer has a duration that is based at least in part on the propagation delay.

Aspect 15: The method of any of aspects 10-14, further comprising stopping the DRX retransmission timer, if miming, or not starting the DRX retransmission timer, if not running, based at least in part on receiving an indication from control channel bits indicating that the HARQ feedback corresponds to a specific HARQ process associated with the DRX retransmission timer.

Aspect 16: The method of any of aspects 10-15, further comprising determining a HARQ process to which the HARQ feedback corresponds based at least in part on the propagation delay, and stopping the DRX retransmission timer associated with the HARQ process.

Aspect 17: A method of wireless communication performed by a base station, comprising: receiving repetitions of an uplink communication from a user equipment (UE); and transmitting, to the UE a first time period before a last repetition of the repetitions is received from the UE, an uplink grant for a new transmission or hybrid automatic repeat request (HARQ) feedback for the uplink communication, wherein the first time period is based at least in part on a propagation delay between the UE and the base station via a non-terrestrial network (NTN) entity.

Aspect 18: The method of aspect 17, wherein the first time period is equal to or greater than the propagation delay.

Aspect 19: The method of aspect 17 or 18, wherein the uplink grant or the HARQ feedback is transmitted by the base station such that the uplink grant or the HARQ feedback is received by the UE after the last repetition was transmitted by the UE or a second time period after a first repetition of the repetitions was transmitted, whichever is later.

Aspect 20: The method of any of aspects 17-19, further comprising transmitting an indication that the HARQ feedback corresponds to a specific HARQ process associated with a discontinuous reception retransmission timer.

Aspect 21: The method of any of aspects 17-19, further comprising transmitting transmit an indication that the HARQ feedback is for a first HARQ process associated with a discontinuous reception retransmission timer.

Aspect 22: An apparatus for wireless communication at a device, comprising a processor; memory coupled with the processor; and instructions stored in the memory and executable by the processor to cause the apparatus to perform the method of one or more aspects of aspects 1-21.

Aspect 23: A device for wireless communication, comprising a memory and one or more processors coupled to the memory, the memory and the one or more processors configured to perform the method of one or more aspects of aspects 1-21.

Aspect 24: An apparatus for wireless communication, comprising at least one means for performing the method of one or more aspects of aspects 1-21.

Aspect 25: A non-transitory computer-readable medium storing code for wireless communication, the code comprising instructions executable by a processor to perform the method of one or more aspects of aspects 1-21.

Aspect 26: A non-transitory computer-readable medium storing a set of instructions for wireless communication, the set of instructions comprising one or more instructions that, when executed by one or more processors of a device, cause the device to perform the method of one or more aspects of aspects 1-21.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors coupled to the memory, the one or more processors configured to:
      transmit repetitions of an uplink communication to a network entity;
      monitor a physical downlink control channel to receive, a time period after transmitting a first repetition of the repetitions, hybrid automatic repeat request (HARQ) feedback or an uplink grant for a new transmission, wherein the time period corresponds to a propagation delay to the network entity via a non-terrestrial network (NTN) entity; and
      start, without using a HARQ round trip timer, a discontinuous reception (DRX) retransmission timer after transmitting a last repetition of the repetitions, the HARQ feedback or the uplink grant being received during the DRX retransmission timer.

2. The UE of claim 1, wherein the one or more processors, when monitoring to receive the HARQ feedback or the uplink grant, are configured to receive the HARQ feedback or the uplink grant after the last repetition was transmitted or a time period after the first repetition was transmitted, whichever is later.

3. The UE of claim 1, wherein the one or more processors, when starting the DRX retransmission timer, are configured to start the DRX retransmission timer after the time period that is based at least in part on the propagation delay.

4. The UE of claim 1, wherein the one or more processors, when starting the DRX retransmission timer, are configured to extend the DRX retransmission timer by an offset that is based at least in part on the propagation delay.

5. The UE of claim 1, wherein the DRX retransmission timer has a duration that is based at least in part on the propagation delay.

6. The UE of claim 1, wherein the one or more processors are further configured to stop the DRX retransmission timer, if running, or to not start the DRX retransmission timer, if not running, based at least in part on receiving an indication from control channel bits indicating that the HARQ feedback corresponds to a specific HARQ process associated with the DRX retransmission timer.

7. The UE of claim 1, wherein the one or more processors are further configured to:
   determine a HARQ process to which the HARQ feedback corresponds based at least in part on the propagation delay; and
   stop the DRX retransmission timer associated with the HARQ process.

8. The UE of claim 1, wherein the one or more processors, when receiving the HARQ feedback or the uplink grant, are configured to receive the HARQ feedback or the uplink grant a time period after a first repetition of the repetitions was transmitted.

9. The UE of claim 8, wherein the one or more processors, when receiving the HARQ feedback or the uplink grant, are configured to receive the HARQ feedback or the uplink grant after starting the DRX retransmission timer.

10. A method of wireless communication performed by a user equipment (UE), comprising:
    transmitting repetitions of an uplink communication to a network entity;
    monitoring a physical downlink control channel to receive, a time period after transmitting a first repetition of the repetitions, hybrid automatic repeat request (HARQ) feedback or an uplink grant for a new transmission, wherein the time period corresponds to a propagation delay to the network entity via a non-terrestrial network (NTN) entity; and
    starting, without using a HARQ round trip timer, a discontinuous reception (DRX) retransmission timer after transmitting a last repetition of the repetitions, the HARQ feedback or the uplink grant being received during the DRX retransmission timer.

11. The method of claim 10, wherein, when monitoring to receive the HARQ feedback or the uplink grant, the method comprises receiving the HARQ feedback or the uplink grant after the last repetition was transmitted or a time period after the first repetition was transmitted, whichever is later.

12. The method of claim 10, when receiving the HARQ feedback or the uplink grant, the method comprises receiving the HARQ feedback or the uplink grant a time period after a first repetition of the repetitions was transmitted.

13. The method of claim 10, wherein, when starting the DRX retransmission timer, the method comprises starting the DRX retransmission timer after the time period that is based at least in part on the propagation delay.

14. The method of claim 10, wherein, when starting the DRX retransmission timer, the method comprises extending the DRX retransmission timer by an offset that is based at least in part on the propagation delay.

15. The method of claim 10, wherein the DRX retransmission timer has a duration that is based at least in part on the propagation delay.

16. The method of claim 10, further comprising stopping the DRX retransmission timer, if running, or not starting the DRX retransmission timer, if not running, based at least in part on receiving an indication from control channel bits indicating that the HARQ feedback corresponds to a specific HARQ process associated with the DRX retransmission timer.

17. The method of claim 10, further comprising:
determining a HARQ process to which the HARQ feedback corresponds based at least in part on the propagation delay; and
stopping the DRX retransmission timer associated with the HARQ process.

18. A non-transitory computer-readable medium storing a set of instructions for wireless communication, the set of instructions comprising:
one or more instructions that, when executed by one or more processors of a user equipment (UE), cause the UE to:
transmit repetitions of an uplink communication to a network entity;
monitor a physical downlink control channel to receive, a time period after transmitting a first repetition of the repetitions, hybrid automatic repeat request (HARQ) feedback or an uplink grant for a new transmission, wherein the time period corresponds to a propagation delay to the network entity via a non-terrestrial network (NTN) entity; and
start, without using a HARQ round trip timer, a discontinuous reception (DRX) retransmission timer after transmitting a last repetition of the repetitions, the HARQ feedback or the uplink grant being received during the DRX retransmission timer.

19. The computer-readable medium of claim 18, wherein, when starting the DRX retransmission timer, the one or more instructions, when executed by the one or more processors of the UE, cause the UE to:
extend the DRX retransmission timer by an offset that is based at least in part on the propagation delay.

20. The computer-readable medium of claim 18, wherein the DRX retransmission timer has a duration that is based at least in part on the propagation delay.

21. The computer-readable medium of claim 18, wherein the one or more instructions, when executed by the one or more processors of the UE, further cause the UE to:
stop the DRX retransmission timer, if running, or to not start the DRX retransmission timer, if not running, based at least in part on receiving an indication from control channel bits indicating that the HARQ feedback corresponds to a specific HARQ process associated with the DRX retransmission timer.

22. The computer-readable medium of claim 18, wherein the one or more instructions, when executed by the one or more processors of the UE, further cause the UE to:
determine a HARQ process to which the HARQ feedback corresponds based at least in part on the propagation delay; and
stop the DRX retransmission timer associated with the HARQ process.

23. The computer-readable medium of claim 18, wherein the one or more instructions, when executed by the one or more processors of the UE, further cause the UE to:
receive the HARQ feedback or the uplink grant a time period after a first repetition of the repetitions was transmitted.

24. An apparatus for wireless communication, comprising:
means for transmitting repetitions of an uplink communication to a network entity;
means for monitoring a physical downlink control channel to receive, a time period after transmitting a first repetition of the repetitions, hybrid automatic repeat request (HARQ) feedback or an uplink grant for a new transmission, wherein the time period corresponds to a propagation delay to the network entity via a non-terrestrial network (NTN) entity; and
means for starting, without using a HARQ round trip timer, a discontinuous reception (DRX) retransmission timer after transmitting a last repetition of the repetitions, the HARQ feedback or the uplink grant being received during the DRX retransmission timer.

25. The apparatus of claim 24, wherein the means for starting the DRX retransmission timer include means for extending the DRX retransmission timer by an offset that is based at least in part on the propagation delay.

26. The apparatus of claim 24, wherein the DRX retransmission timer has a duration that is based at least in part on the propagation delay.

27. The apparatus of claim 24, further comprising:
means for stopping the DRX retransmission timer, if running, or not starting the DRX retransmission timer, if not running, based at least in part on receiving an indication from control channel bits indicating that the HARQ feedback corresponds to a specific HARQ process associated with the DRX retransmission timer.

28. The apparatus of claim 24, further comprising:
means for determining a HARQ process to which the HARQ feedback corresponds based at least in part on the propagation delay; and
means for stopping the DRX retransmission timer associated with the HARQ process.

29. The apparatus of claim 24, further comprising:
means for receiving the HARQ feedback or the uplink grant a time period after a first repetition of the repetitions was transmitted.

* * * * *